(12) United States Patent
Bai et al.

(10) Patent No.: US 10,140,529 B2
(45) Date of Patent: Nov. 27, 2018

(54) METHOD, APPARATUS AND DEVICE FOR DETECTING LANE LINES

(71) Applicants: NEUSOFT CORPORATION, Shenyang (CN); NEUSOFT REACH AUTOMOTIVE TECHNOLOGY (SHANGHAI) CO., LTD., Shanghai (CN)

(72) Inventors: Wenjing Bai, Shenyang (CN); Yingfang Du, Shenyang (CN); Wei Liu, Shenyang (CN); Huai Yuan, Shenyang (CN)

(73) Assignees: NEUSOFT CORPORATION, Shenyang (CN); TECHNOLOGY (SHANGHAI) CO., LTD., Shanghai (CN)

( * ) Notice: Subject to any disclaimer, the term of this patent is extended or adjusted under 35 U.S.C. 154(b) by 42 days.

(21) Appl. No.: 15/361,074

(22) Filed: Nov. 25, 2016

(65) Prior Publication Data
US 2018/0060677 A1 Mar. 1, 2018

(30) Foreign Application Priority Data
Aug. 29, 2016 (CN) .......................... 2016 1 0748872

(51) Int. Cl.
*G06K 9/00* (2006.01)
*B60R 11/04* (2006.01)
(Continued)

(52) U.S. Cl.
CPC .......... *G06K 9/00798* (2013.01); *B60R 11/04* (2013.01); *G06K 9/40* (2013.01);
(Continued)

(58) Field of Classification Search
CPC .. G06K 9/52; G06K 9/00798; G06K 9/00805; G06K 9/46; G06T 2207/30256; B60R 2300/804
See application file for complete search history.

(56) References Cited

U.S. PATENT DOCUMENTS

| | | | | | |
|---|---|---|---|---|---|
| 5,790,403 | A | * | 8/1998 | Nakayama | ........... G05D 1/0246 340/435 |
| 6,091,833 | A | * | 7/2000 | Yasui | ................... G05D 1/0246 348/118 |

(Continued)

OTHER PUBLICATIONS

D. Kang, J. Choi, and I. Kweon, "Finding and tracking road lanes using "line-snakes"," in Proceedings of the 1996 IEEE Intelligent Vehicles Symposium, Sep. 1996, pp. 189-194. [Online]. Available: http://ieeexplore.ieee.org/iel3/4275/12309/00566376.pdf(Year: 1996).*

*Primary Examiner* — Bhavesh M Mehta
*Assistant Examiner* — Ian L Lemieux
(74) *Attorney, Agent, or Firm* — Kilpatrick Townsend & Stockton LLP

(57) ABSTRACT

A method for detecting a lane line is provided. The method includes: determining candidate lane line regions in a lane image by filtering the lane image; extracting center points for each candidate lane line region; obtaining a fitting curve of each candidate lane line region by performing curve fitting on the center points of each candidate lane line region; classifying the candidate lane line regions as rectilinear and curvilinear candidate lane line regions according to a slope angle of the fitting curve of each candidate lane line region; dividing the candidate lane line regions into groups based on the classifying result; and determining two groups, which meet a first predetermined condition, as target groups, and recognizing candidate lane line regions in the target groups as lane line regions. Besides, an apparatus and a device for detecting a lane line are further provided.

20 Claims, 11 Drawing Sheets

(51) Int. Cl.
*G06K 9/40* (2006.01)
*G06K 9/52* (2006.01)
*G06K 9/62* (2006.01)
*H04N 7/18* (2006.01)
*H04N 5/232* (2006.01)

(52) U.S. Cl.
CPC ............... *G06K 9/52* (2013.01); *G06K 9/627* (2013.01); *G06K 9/628* (2013.01); *H04N 7/188* (2013.01); *H04N 5/23293* (2013.01); *H04N 7/183* (2013.01)

(56) References Cited

U.S. PATENT DOCUMENTS

| | | | |
|---|---|---|---|
| 6,823,241 B2 * | 11/2004 | Shirato | G06K 9/4609 701/1 |
| 8,224,031 B2 * | 7/2012 | Saito | G06K 9/6205 348/187 |
| 2003/0103649 A1 * | 6/2003 | Shimakage | G06K 9/00798 382/104 |
| 2007/0107965 A1 * | 5/2007 | Kakinami | G06K 9/00798 180/167 |
| 2008/0317288 A1 * | 12/2008 | Aoki | G06K 9/00798 382/104 |
| 2011/0052079 A1 * | 3/2011 | Tamura | G06K 9/00798 382/199 |
| 2015/0269446 A1 * | 9/2015 | Takemae | G06K 9/00798 382/199 |
| 2015/0278613 A1 * | 10/2015 | Takemae | G06K 9/00798 382/104 |
| 2018/0033148 A1 * | 2/2018 | Zheng | G06T 7/0085 |

\* cited by examiner

METHOD, APPARATUS AND DEVICE FOR DETECTING LANE LINES

CROSS REFERENCE TO RELATED APPLICATIONS

The present application claims the priority to Chinese Patent Application No. 201610748872.5, entitled "METHOD, APPARATUS AND DEVICE FOR DETECTING LANE LINES", filed on Aug. 29, 2016 with the State Intellectual Property Office of People's Republic of China, which is incorporated herein by reference in its entirety.

FIELD

The present disclosure relates to the technical field of information processing, and in particular to a method, an apparatus and a device for detecting a lane line.

BACKGROUND

At present, many vehicles are provided with a driving assistance system. Some driver assistance systems can provide lane information for vehicles by detecting lane lines on roads. For example, as an important part of an advanced driver assistance system (ADAS), a vehicle departure warning system can detect information of a lane where a vehicle is running, and give a warning prompt to a driver when the vehicle deviates from the lane, to guarantee driving safety.

In conventional technology, lane line regions in a lane image can be detected by filtering the lane image, and generally, lane information can be identified through lane lines. However, according to the research made by the inventor, some of the lane line regions obtained by filtering are regions of real lane lines while some are not. That is to say, not all the lane line regions detected with conventional technology are regions of real lane lines, but the detected lane line regions as well include some noise regions which do not correspond to the real lane lines. Therefore, detection of lane line regions in conventional technology is not accurate enough, which will result in inaccurate detection of lane information and thereby cause the vehicle departure warning system to fail to give a warning prompt accurately.

SUMMARY

In view of the above, a method, an apparatus and a device for detecting a lane line is provided according to the present disclosure, to filter out regions which do not correspond to real lane lines from lane line regions obtained by filtering so as to make detection of lane line regions and lane information more accurate, thereby enabling a vehicle departure warning system to give a warning prompt more accurately.

In a first aspect, a method for detecting a lane line is provided, which includes:

determining candidate lane line regions in a lane image by filtering the lane image;

extracting center points for each of the candidate lane line regions, where the center points include a midpoint between two endpoints of each row in each of the candidate lane line regions;

obtaining a fitting curve of each of the candidate lane line regions by performing curve fitting on the center points of each of the candidate lane line regions;

classifying the candidate lane line regions as rectilinear candidate lane line regions and curvilinear candidate lane line regions according to a slope angle of the fitting curve of each of the candidate lane line regions;

dividing the candidate lane line regions into groups based on the classifying result, where each curvilinear candidate lane line region alone forms a group, one or more rectilinear candidate lane line regions form a group and candidate lane line regions in a same group correspond to a same lane line; and determining two of the groups, which meet a first predetermined condition, as target groups, and recognizing candidate lane line regions in the target groups as lane line regions, where the first predetermined condition includes at least one of: a distance between lane lines corresponding to the two groups is within a first predetermined range of distance, and an included angle of the lane lines corresponding to the two groups is within a first predetermined range of included angle.

Optionally, two rectilinear candidate lane line regions which meet a second predetermined condition are in a same group, where the second predetermined condition includes: fitting line segments of the two rectilinear candidate lane line regions do not overlap each other in a vertical direction, a distance between center points, which are closest to each other in the vertical direction, of the two rectilinear candidate lane line regions is within a second predetermined range of distance, and a directional deviation between the fitting line segments of the two rectilinear candidate lane line regions is within a predetermined range of deviation, where the fitting line segments of the rectilinear candidate lane line regions are obtained by performing rectilinear fitting on center points of the rectilinear candidate lane line regions.

Optionally, after extracting center points for each of the candidate lane line regions, the method further includes:

recognizing the number of effective pixels in the center points as an effective pixel number, for each of the candidate lane line regions; and filtering out ones of the candidate lane line regions which have effective pixel numbers smaller than a predetermined number threshold, and for the remaining ones of the candidate lane line regions, performing the action of curve fitting on the center points of each of the candidate lane line regions.

Optionally, obtaining the fitting curve of each of the candidate lane line regions by performing curve fitting on the center points of each of the candidate lane line regions includes:

selecting multiple control points from the center points of each of the candidate lane line regions, where the control points include center points at two ends of each of the candidate lane line regions;

obtaining curve equations of pairs of adjacent control points in each of the candidate lane line regions by perform fitting on the control points of each of the candidate lane line regions; and forming the fitting curve of each of the candidate lane line regions with the curve equations of the pairs of adjacent control points of each of the candidate lane line regions.

Optionally, selecting multiple control points from the center points of each of the candidate lane line regions includes:

determining whether there is an inflection point in the center points of each of the candidate lane line regions, where the inflection point is a peak point or a valley point;

in response to no inflection point being in the center points of one of the candidate lane line regions, selecting first target points from the candidate lane line region as the control points, where distances between the pairs of adjacent first target points in the candidate lane line region are equal to each other and the first target points of the candidate lane line region include center points at two ends of the candidate lane line region; and in response to an inflection point being in the center points of the candidate lane line region, selecting second target points from the candidate lane line region as the control points, where the second target points as the control points of the candidate lane line region include the center points at two ends of the candidate lane line region and the inflection point, distances between any adjacent two second target points located between a center point at a first end of the candidate lane line region and the inflection point are equal to each other, and distances between any adjacent two second target points located between a center point at a second end of the candidate lane line region and the inflection point are equal to each other.

Optionally, the method further includes:

calculating a real length of each of the candidate lane line regions and determining whether there is an inflection point in the center points of each of the candidate lane line regions, where the inflection point is a peak point or a valley point; and recognizing ones of the candidate lane line regions, real lengths of which are within a predetermined range of length and the center points of which do not include an inflection point, as rectilinear candidate lane line regions, and, for the rest of the candidate lane line regions, performing the step of classifying the candidate lane line regions as rectilinear candidate lane line regions and curvilinear candidate lane line regions according to the slope angle of the fitting curve of each of the candidate lane line regions.

Optionally, classifying the candidate lane line regions as rectilinear candidate lane line regions and curvilinear candidate lane line regions according to the slope angle of the fitting curve of each of the candidate lane line regions includes:

selecting a first sampling point, a second sampling point and a third sampling point from the center points of each of the candidate lane line regions;

calculating slope angles of the fitting curve at the first sampling point, the second sampling point and the third sampling point as a first slope angle, a second slope angle and a third slope angle, for each of the candidate lane line regions; and recognizing, based on the first slope angle, the second slope angle and the third slope angle of each of the candidate lane line regions, ones of the candidate lane line regions, which meet a third predetermined condition or a fourth predetermined condition, as curvilinear candidate lane line regions and other ones of the candidate lane line regions which meet neither the third predetermined condition nor the fourth predetermined condition as rectilinear candidate lane line regions, where the third predetermined condition is as follows: both a difference between the first slope angle and the second slope angle of the corresponding candidate lane line region and a difference between the second slope angle and the third slope angle of the corresponding candidate lane line region are greater that a first slope angle threshold, and where the fourth predetermined condition is as follows: a difference between the first slope angle and the second slope angle of the corresponding candidate lane line region is smaller than the first slope angle threshold and a difference between the second slope angle and the third slope angle of the corresponding candidate lane line regions is greater than a second slope angle threshold.

Optionally, selecting the first sampling point, the second sampling point and the third sampling point from the center points of each of the candidate lane line regions includes:

determining whether there is an inflection point in the center points of each of the candidate lane line regions, where the inflection point is a peak point or a valley point;

in response to no inflection point being in the center points of one of the candidate lane line region, selecting any three center points from the candidate lane line region as the first sampling point, the second sampling point and the third sampling point of the candidate lane line region; and in response to an inflection point being in the center points of the candidate lane line region, determining the inflection point in the candidate lane line region as the second sampling point of the candidate lane line region and selecting two center points at two sides of the second sampling point in the candidate lane line region as the first sampling point and the third sampling point of the candidate lane line region.

Optionally, determining whether there is the inflection point in the center points of each of the candidate lane line regions includes:

searching for a third target point with a maximum horizontal coordinate and a fourth target point with a minimum horizontal coordinate in the center points of each of the candidate lane line regions;

in response to the third target point and the fourth target point meeting a fifth predetermined condition or a sixth predetermined condition, determining that there is an inflection point in the center points of the corresponding candidate lane line region; and in response to the third target point and the fourth target point meeting neither the fifth predetermined condition nor the sixth predetermined condition, determining that there is no inflection point in the center points of the corresponding candidate lane line region, where the fifth predetermined condition is as follows: the third target point is in the middle of the corresponding candidate lane line region and the fourth target point is in either one of two ends of the corresponding candidate lane line region, and where the sixth predetermined condition is as follows: the fourth target point is in the middle of the corresponding candidate lane line region and the third target point is in either one of the two ends of the corresponding candidate lane line region.

Optionally, the directional deviation between the fitting line segments of the two rectilinear candidate lane line regions being within the predetermined range of deviation includes at least of the following: an included angle of the fitting line segments of the two rectilinear candidate lane line regions is within a second predetermined range of included angle, an estimated real included angle of the two rectilinear candidate lane line regions is within a third predetermined range of included angle and a deviation distance between the fitting line segments of the two rectilinear candidate lane line regions is within a third predetermined range of distance, where the deviation distance is a distance between a first intersection point and a second intersection point, the first intersection point and the second intersection point are intersection points of extension lines of the fitting line segments of the two rectilinear candidate lane line regions and a horizontal midline, respectively, and distances between closest center points of the two rectilinear candidate lane line regions in the vertical direction and the horizontal midline are equal to each other.

Optionally, the second predetermined condition further includes: in a case that the included angle of the fitting line segments of the two rectilinear candidate lane line regions is within a fourth predetermined range of included angle, the deviation distance between the fitting line segments of the two rectilinear candidate lane line regions is within a fourth predetermined range of distance, where the second predetermined range of included angle is wider than the fourth predetermined range of included angle and the third predetermined range of distance is wider that the fourth predetermined range of distance.

Optionally, after recognizing candidate lane line regions in the target groups as lane line regions, the method further includes:

performing fitting on the lane line regions in the target groups, to obtain lane lines in the lane image, where the lane line regions in each of the target groups are fitted into a lane line.

In a second aspect, an apparatus for detecting a lane line is provided, which includes:

a filtering unit, configured to determine candidate lane line regions in a lane image by filtering the lane image;

an extracting unit, configured to extract center points for each of the candidate lane line regions, where the center points include a midpoint between two endpoints of each row in each of the candidate lane line regions;

a first fitting unit, configured to obtain a fitting curve of each of the candidate lane line regions by performing curve fitting on the center points of each of the candidate lane line regions;

a classifying unit, configured to classify the candidate lane line regions as rectilinear candidate lane line regions and curvilinear candidate lane line regions according to a slope angle of the fitting curve of each of the candidate lane line regions;

a grouping unit, configured to divide the candidate lane line regions into groups based on the classifying result, where each curvilinear candidate lane line region alone forms a group, one or more rectilinear candidate lane line regions form a group and candidate lane line regions in a same group correspond to a same lane line; and a first recognition unit, configured to determine two of the groups, which meet a first predetermined condition, as target groups and recognize candidate lane line regions in the target groups as lane line regions, where the first predetermined condition includes at least one of the following: a distance between lane lines corresponding to the two groups is within a first predetermined range of distance, and an included angle of the lane lines corresponding to the two groups is within a first predetermined range of included angle.

Optionally, two rectilinear candidate lane line regions which meet a second predetermined condition are in a same group, where the second predetermined condition includes: fitting line segments of the two rectilinear candidate lane line regions do not overlap each other in a vertical direction, a distance between center points, which are closest to each other in the vertical direction, of the two rectilinear candidate lane line regions is within a second predetermined range of distance, and a directional deviation between the fitting line segments of the two rectilinear candidate lane line regions is within a predetermined range of deviation, where the fitting line segments of the rectilinear candidate lane line regions are obtained by performing rectilinear fitting on center points of the rectilinear candidate lane line regions.

Optionally, the apparatus further includes:

a second recognition unit, configured to, after extracting the center points for each of the candidate lane line regions, recognize the number of effective pixels in the center points as an effective pixel number, for each of the candidate lane line regions; and a filtering unit, configured to filter out ones of the candidate lane line regions, which have effective pixel numbers smaller than a predetermined number threshold, and for the remaining ones of the candidate lane line regions, perform the action of curve fitting on the center points of each of the candidate lane line regions.

Optionally, the first fitting unit includes:

a first selecting unit, configured to select multiple control points from the center points of each of the candidate lane line regions, where the control points include center points at two ends of each of the candidate lane line regions;

a second fitting unit, configured to obtain curve equations of pairs of adjacent control points in each of the candidate lane line regions by perform fitting on the control points of each of the candidate lane line regions; and a forming unit, configured to form the fitting curve of each of the candidate lane line regions with the curve equations of the pairs of adjacent control points of each of the candidate lane line regions.

Optionally, the first selecting unit includes:

a determining unit, configured to determine whether there is an inflection point in the center points of each of the candidate lane line regions, where the inflection point is a peak point or a valley point;

a second selecting unit, configured to, in response to no inflection point being in the center points of one of the candidate lane line regions, select first target points from the candidate lane line region as the control points, where distances between the pairs of adjacent first target points in the candidate lane line region are equal to each other and the first target points of the candidate lane line region include center points at two ends of the candidate lane line region; and a third selecting unit, configured to, in response to an inflection point being in the center points of the candidate lane line region, select second target points from the candidate lane line region as the control points in a case that there is an inflection point in the candidate lane line region, where the second target points as the control points of the candidate lane line region include center points at two ends of the candidate lane line region and the inflection point, distances between any adjacent two second target points located between center point at a first end of the candidate lane line region and the inflection point are equal to each other and distances between any adjacent two second target points located between a center point at a second end of the candidate lane line region and the inflection point are equal to each other.

Optionally, the apparatus further includes:

a first calculating unit, configured to calculate a real length of each of the candidate lane line regions and determining whether there is an inflection point in the center points of each of the candidate lane line regions, where the inflection point is a peak point or a valley point; and a third recognition unit, configured to recognize ones of the candidate lane line regions, real lengths of which are within a predetermined range of length and the center points of which do not include an inflection point, as rectilinear candidate lane line regions, and, for the rest of the candidate lane line regions, perform the step of classifying the candidate lane line regions as rectilinear candidate lane line regions and curvilinear candidate lane line regions according to the slope angle of the fitting curve of each of the candidate lane line regions.

Optionally, the classifying unit includes:

a fourth selecting unit, configured to select a first sampling point, a second sampling point and a third sampling point from the center points of each of the candidate lane line regions, where a distance between the first sampling point and the second sampling point is equal to a distance between the second sampling point and the third sampling point;

a second calculating unit, configured to calculate slope angles of the fitting curve at the first sampling point, the second sampling point and the third sampling point as a first slope angle, a second slope angle and a third slope angle, for each of the candidate lane line regions; and a fourth recognition unit, configured to recognize, based on the first slope angle, the second slope angle and the third slope angle of each of the candidate lane line regions, ones of the candidate lane line regions, which meet a third predetermined condition or a fourth predetermined condition, as curvilinear candidate lane line regions and other ones of the candidate lane line regions which meet neither the third predetermined condition nor the fourth predetermined condition as rectilinear candidate lane line regions, where the third predetermined condition is as follows: both a difference between the first slope angle and the second slope angle of the corresponding candidate lane line region and a difference between the second slope angle and the third slope angle of the corresponding candidate lane line region are greater that a first slope angle threshold, and the fourth predetermined condition is as follows: a difference between the first slope angle and the second slope angle of the corresponding candidate lane line region is smaller than the first slope angle threshold and a difference between the second slope angle and the third slope angle of the corresponding candidate lane line regions is greater than a second slope angle threshold.

Optionally, the fourth selecting unit includes:

a determining unit, configured to determine whether there is an inflection point in the center points of each of the candidate lane line regions, where the inflection point is a peak point or a valley point;

a fifth selecting unit, configured to, in response to no inflection point being in the center points of one of the candidate lane line regions, select any three evenly spaced center points from the candidate lane line region as the first sampling point, the second sampling point and the third sampling point of the candidate lane line region; and a sixth selecting unit, configured to, in response to an inflection point being in the center points of the candidate lane line region, determine the inflection point in the candidate lane line region as the second sampling point of the candidate lane line region and select center points at two sides of the second sampling point in the candidate lane line region as the first sampling point and the third sampling point of the candidate lane line region, where the distance from the center point selected as the first sampling point to the second sampling point is equal to the distance from the center point selected as the third sampling point to the second sampling point.

Optionally, the determining unit includes:

a searching unit, configured to search for a third target point with a maximum horizontal coordinate and a fourth target point with a minimum horizontal coordinate in the center points of each of the candidate lane line regions;

a first determining unit, configured to determine that there is an inflection point in the center points of the corresponding candidate lane line region in response to the third target point and the fourth target point meeting a fifth predetermined condition or a sixth predetermined condition; and a second determining unit, configured to determine that there is no inflection point in the center points of the corresponding candidate lane line region in response to third target point and the fourth target point meeting neither the fifth predetermined condition nor the sixth predetermined condition, where the fifth predetermined condition is as follows: the third target point is in the middle of the corresponding candidate lane line region and the fourth target point is in either one of two ends of the corresponding candidate lane line region, and where the sixth predetermined condition is as follows: the fourth target point is in the middle of the corresponding candidate lane line region and the third target point is in either one of the two ends of the corresponding candidate lane line region.

Optionally, in a case that the two rectilinear candidate lane line regions which meet the second predetermined condition are in a same group, the directional deviation between the fitting line segments of the two rectilinear candidate lane line regions being within the predetermined range of deviation includes at least one of the following: an included angle of the fitting line segments of the two rectilinear candidate lane line regions is within a second predetermined range of included angle, an estimated real included angle of the two rectilinear candidate lane line regions is within a third predetermined range of included angle and a deviation distance between the fitting line segments of the two rectilinear candidate lane line regions is within a third predetermined range of distance, where the deviation distance is a distance between a first intersection point and a second intersection point, the first intersection point and the second intersection point are intersection points of extension lines of the fitting line segments of the two rectilinear candidate lane line regions and a horizontal midline, respectively, and distances between closest center points of the two rectilinear candidate lane line regions in the vertical direction and the horizontal midline are equal to each other.

Optionally, in a case that the two rectilinear candidate lane line regions which meet the second predetermined condition are in a same group, the second predetermined condition further includes: in a case that the included angle of the fitting line segments of the two rectilinear candidate lane line regions is within a fourth predetermined range of included angle, the deviation distance between the fitting line segments of the two rectilinear candidate lane line regions is within a fourth predetermined range of distance, where the second predetermined range of included angle is wider than the fourth predetermined range of included angle, and the third predetermined range of distance is wider that the fourth predetermined range of distance.

Optionally, the apparatus further includes:

a third fitting unit, configured to performing fitting on the lane line regions in the target groups after the candidate lane line regions in the target groups are recognized as the lane line regions, to obtain lane lines in the lane image, where the lane line regions in each target group are fitted into a lane line.

In a third aspect, a device for detecting a lane line is provided, which includes a processor, a memory, a communication interface and a bus system.

The bus system is configured to couple hardware of the device together.

The communication interface is configured to implement communication connection between the device and at least one other device.

The memory is configured to store program instructions and data.

The processor is configured to read the instructions and the data stored in the memory and perform the following operations:

determining candidate lane line regions in a lane image by filtering the lane image;

extracting center points for each of the candidate lane line regions, where the center points include a midpoint between two endpoints of each row in each of the candidate lane line regions;

obtaining a fitting curve of each of the candidate lane line regions by performing curve fitting on the center points of each of the candidate lane line regions;

classifying the candidate lane line regions into rectilinear candidate lane line regions and curvilinear candidate lane line regions according to a slope angle of the fitting curve of each of the candidate lane line regions;

dividing the candidate lane line regions into groups based on the classifying result, where each curvilinear candidate lane line region alone forms a group, one or more rectilinear candidate lane line regions form a group and candidate lane line regions in a same group correspond to a same lane line; and determining two of the groups, which meet a first predetermined condition, as target groups, and recognizing candidate lane line regions in the target groups as lane line regions, where the first predetermined condition includes at least one of the following: a distance between lane lines corresponding to the two groups is within a first predetermined range of distance, and an included angle of the lane lines corresponding to the two groups is within a first predetermined range of included angle.

Optionally, two rectilinear candidate lane line regions which meet a second predetermined condition are in a same group, where the second predetermined condition includes: fitting line segments of the two rectilinear candidate lane line regions do not overlap each other in a vertical direction, a distance between center points, which are closest to each other in the vertical direction, of the two rectilinear candidate lane line regions is within a second predetermined range of distance, and a directional deviation between the fitting line segments of the two rectilinear candidate lane line regions is within a predetermined range of deviation, where the fitting line segments of the rectilinear candidate lane line regions are obtained by performing rectilinear fitting on center points of the rectilinear candidate lane line regions.

Optionally, after extracting the center points for each of the candidate lane line regions, the processor may further perform the following operations:

recognizing the number of effective pixels in the center points as an effective pixel number, for each of the candidate lane line regions; and filtering out ones of the candidate lane line regions with effective pixel numbers smaller than a predetermined number threshold, and for the remaining ones of the candidate lane line regions, performing the action of curve fitting on the center points of each of the candidate lane line regions.

Optionally, the processor may obtain the fitting curve of each of the candidate lane line regions by performing the curve fitting on the center points of each of the candidate lane line regions by performing the following operations:

selecting multiple control points from the center points of each of the candidate lane line regions, where the control points include center points at two ends of each of the candidate lane line regions;

obtaining curve equations of pairs of adjacent control points in each of the candidate lane line regions by perform fitting on the control points of each of the candidate lane line regions; and forming the fitting curve of each of the candidate lane line regions with the curve equations of the pairs of adjacent control points of each of the candidate lane line regions.

Optionally, the processor may select the multiple control points from the center points of each of the candidate lane line regions by performing the following operations:

determining whether there is an inflection point in the center points of each of the candidate lane line regions, where the inflection point is a peak point or a valley point;

in response to no inflection point being in the center points of one of the candidate lane line regions, selecting first target points from the candidate lane line region as the control points, where distances between the pairs of adjacent first target points in the candidate lane line region are equal to each other and the first target points of the candidate lane line region include center points at two ends of the candidate lane line region; and in response to an inflection point being in the center points of the candidate lane line region, selecting second target points from the candidate lane line region as the control points, where the second target points as the control points of the candidate lane line region include the center points at two ends of the candidate lane line region and the inflection point, distances between any adjacent two second target points located between a center point at a first end of the candidate lane line region and the inflection point are equal to each other, and distances between any adjacent two second target points located between a center point at a second end of the candidate lane line region and the inflection point are equal to each other.

Optionally, the processor may further perform the following operations:

calculating a real length of each of the candidate lane line regions and determining whether there is an inflection point in the center points of each of the candidate lane line regions, where the inflection point is a peak point or a valley point; and recognizing ones of the candidate lane line regions, real lengths of which are within a predetermined range of length and the center points of which do not include an inflection point, as rectilinear candidate lane line regions, and, for the rest of the candidate lane line regions, performing the step of classifying the candidate lane line regions as rectilinear candidate lane line regions and curvilinear candidate lane line regions according to the slope angle of the fitting curve of each of the candidate lane line regions.

Optionally, the processor may classify the candidate lane line regions as rectilinear candidate lane line regions and curvilinear candidate lane line regions according to the slope angle of the fitting curve of each of the candidate lane line regions by performing the following operations:

selecting a first sampling point, a second sampling point and a third sampling point from the center points of each of the candidate lane line regions, where a distance between the first sampling point and the second sampling point is equal to a distance between the second sampling point and the third sampling point;

calculating slope angles of the fitting curve at the first sampling point, the second sampling point and the third sampling point as a first slope angle, a second slope angle and a third slope angle, for each of the candidate lane line regions; and recognizing, based on the first slope angle, the second slope angle and the third slope angle of each of the candidate lane line regions, ones of the candidate lane line regions, which meet a third predetermined condition or a fourth predetermined condition, as curvilinear candidate lane line regions and other ones of the candidate lane line regions, which meet neither the third predetermined condition nor the fourth predetermined condition, as rectilinear candidate lane line regions, where the third predetermined condition is as follows: both a difference between the first slope angle and the second slope angle of the corresponding candidate lane line region and a difference between the second slope angle and the third slope angle of the corresponding candidate lane line region are greater that a first slope angle threshold, and where the fourth predetermined condition is as follows: a difference between the first slope angle and the second slope angle of the corresponding candidate lane line region is smaller than the first slope angle threshold and a difference between the second slope angle and the third slope angle of the corresponding candidate lane line regions is greater than a second slope angle threshold.

Optionally, the processor may select the first sampling point, the second sampling point and the third sampling point from the center points of each of the candidate lane line regions by performing the following operations:

determining whether there is an inflection point in the center points of each of the candidate lane line regions, where the inflection point is a peak point or a valley point;

in response to no inflection point being in the center points of one of the candidate lane line regions, selecting any three evenly spaced center points from the candidate lane line region as the first sampling point, the second sampling point and the third sampling point of the candidate lane line region; and in response to an inflection point being in the center points of the candidate lane line region, determining the inflection point in the candidate lane line region as the second sampling point of the candidate lane line region and selecting two center points at two sides of the second sampling point in the candidate lane line region as the first sampling point and the third sampling point of the candidate lane line region, where the distance from the center point selected as the first sampling point to the second sampling point is equal to the distance from the center point selected as the third sampling point to the second sampling point.

Optionally, the processor may determine whether there is the inflection point in the center points of each of the candidate lane line regions by performing the following operations:

searching for a third target point with a maximum horizontal coordinate and a fourth target point with a minimum horizontal coordinate in the center points of each of the candidate lane line regions;

in response to the third target point and the fourth target point meeting a fifth predetermined condition or a sixth predetermined condition, determining that there is an inflection point in the center points of the corresponding candidate lane line region; and in response to the third target point and the fourth target point meeting neither the fifth predetermined condition nor the sixth predetermined condition, determining that there is no inflection point in the center points of the corresponding candidate lane line region, where the fifth predetermined condition is as follows: the third target point is in the middle of the corresponding candidate lane line region and the fourth target point is in either one of two ends of the corresponding candidate lane line region, and where the sixth predetermined condition is as follows: the fourth target point is in the middle of the corresponding candidate lane line region and the third target point is in either one of the two ends of the corresponding candidate lane line region.

Optionally, in a case that the two rectilinear candidate lane line regions which meet the second predetermined condition are in a same group, the directional deviation between the fitting line segments of the two rectilinear candidate lane line regions being within the predetermined range of deviation includes at least of the following: an included angle of the fitting line segments of the two rectilinear candidate lane line regions is within a second predetermined range of included angle, an estimated real included angle of the two rectilinear candidate lane line regions is within a third predetermined range of included angle and a deviation distance between the fitting line segments of the two rectilinear candidate lane line regions is within a third predetermined range of distance, where the deviation distance is a distance between a first intersection point and a second intersection point, the first intersection point and the second intersection point are intersection points of extension lines of the fitting line segments of the two rectilinear candidate lane line regions and a horizontal midline, respectively, and distances between closest center points of the two rectilinear candidate lane line regions in the vertical direction and the horizontal midline are equal to each other.

Optionally, in a case that the two rectilinear candidate lane line regions which meet the second predetermined condition are in a same group, the second predetermined condition may further include: in a case that the included angle of the fitting line segments of the two rectilinear candidate lane line regions is within a fourth predetermined range of included angle, the deviation distance between the fitting line segments of the two rectilinear candidate lane line regions is within a fourth predetermined range of distance, where the second predetermined range of included angle is wider than the fourth predetermined range of included angle, and the third predetermined range of distance is wider that the fourth predetermined range of distance.

Optionally, after recognizing candidate lane line regions in the target groups as lane line regions, the processor may further perform the following operation:

performing fitting on the lane line regions in the target groups, to obtain lane lines in the lane image, where the lane line regions in each of the target groups are fitted into a lane line.

In the present disclosure, the lane image is filtered to obtain filtered regions as the candidate lane line regions. The candidate lane line regions are classified as rectilinear candidate lane line regions and curvilinear candidate lane line regions based on the fitting curves of the candidate lane line regions and are divided into groups based on the classifying result, where the candidate lane line regions in each group form a lane line. Two of the groups, which correspond to lane lines matching each other, are determined as target groups. The candidate lane line regions in the target groups are recognized as the lane line regions. According to the above, after the candidate lane line regions are obtained by filtering the lane image, noise regions which do not correspond to real lane lines can be removed from the candidate lane line regions by grouping and matching of the candidate lane line regions, so that regions in the candidate lane line regions, which correspond to real lane lines, can be recognized as lane line regions, which makes detection of lane line regions more accurate and thus makes detection of lane information more accurate, thereby enabling a vehicle departure warning system to give a warning prompt accurately.

BRIEF DESCRIPTION OF THE DRAWINGS

The drawings to be used in the description of the embodiments are described briefly as follows, so that technical solutions according to the embodiments of the present disclosure may become clearer. Apparently, the drawings in the following descriptions only illustrate some embodiments of invention. For those skilled in the art, other drawings may be obtained based on these drawings.

DETAILED DESCRIPTION

According to the research made by the inventor, in order to detect the lane line in a lane image, filtered regions in the lane image are obtained by filtering the lane image and are determined to be the lane line regions in the lane image, in conventional technology. In practice, since circumstance of a lane is complicated, kerbs, fences and watermarks often on a road may be obtained as filtered regions in filtering the lane image. Therefore, the filtered regions obtained by filtering the lane image may not only include regions of real lane lines, but include regions of other objects as well. As can be seen, detection of lane line regions in conventional technology is not accurate enough, which results in inaccurate detection of lane information and thereby causes a vehicle departure warning system to fail to give a warning prompt accurately.

To solve the problem, in the embodiments according to the present disclosure, a lane image is filtered to obtain filtered regions as candidate lane line regions. The candidate lane line regions are classified as rectilinear candidate lane line regions and curvilinear candidate lane line regions according to fitting curves of the candidate lane line regions and are divided into groups based on the classifying result, where the candidate lane line regions in each group form a lane line. Two of the groups, which correspond to lane lines matching each other, are determined as target groups. The candidate lane line regions in the target groups are recognized as lane line regions. According to the above, after the candidate lane line regions are obtained by filtering the lane image, noise regions which do not correspond to real lane lines can be removed from the candidate lane line regions by grouping and matching of the candidate lane line regions, so that regions in the candidate lane line regions, which correspond to real lane lines, can be recognized as lane line regions, which makes detection of lane line regions more accurate and thus makes detection of lane information more accurate, thereby enabling a vehicle departure warning system to give a warning prompt accurately.

Figure 1:
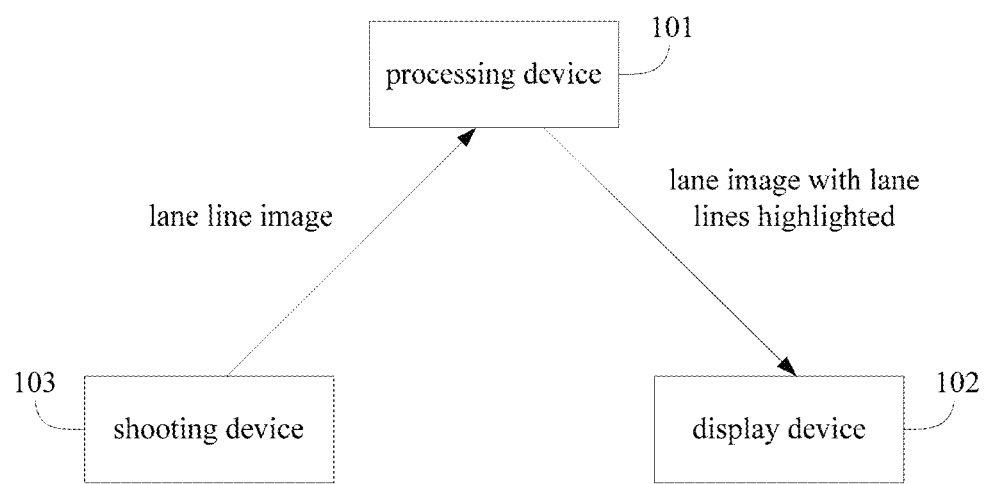
FIG. 1 is a schematic framework diagram of a system involved in an application scenario according to an embodiment of the invention.

For example, the embodiments according to the present disclosure may be applied to a system shown in FIG. 1. For example, the system may be a driving assistance system, and particularly, is a lane departure warning system, for example. The system includes a processing device 101, a display device 102 and a shooting device 103. In the system, the shooting device 103 may capture a lane image and send the lane image to the processing device 101. The processing device 101 may determine candidate lane line regions in the lane image by filtering the lane image. The processing device 101 may extract center points for each of the candidate lane line regions, where the center points include the midpoint between two endpoints of each row in each of the candidate lane line regions. Thereafter, the processing device 101 may obtain a fitting curve of each of the candidate lane line regions by performing curve fitting on the center points of each of the candidate lane line regions. Then the processing device 101 may classify the candidate lane line regions as rectilinear candidate lane line regions and curvilinear candidate lane line regions according to the slope angle of the fitting curve of each of the candidate lane line regions. The processing device 101 may divide the candidate lane line regions into groups based on the classifying result, where each curvilinear candidate lane line region alone forms a group, one or more rectilinear candidate lane line regions form a group and the candidate lane line regions in the same group correspond to the same lane line. At last, the processing device 101 may determine two of the groups, which meet a first predetermined condition, as target groups, and recognize the candidate lane line regions in the target groups as lane line regions. The processing device 101 may further generate a lane image with lane line highlighted based on the lane line regions and send the lane image to the display device 102 for display.

The first predetermined condition may include at least one of the following: a distance between lane lines corresponding to the two groups is less than a first predetermined distance threshold, and an included angle of the lane lines corresponding to the two groups is less than a first predetermined included angle threshold.

Understandably, the scenario above is only an example scenario according to the embodiments of the invention, and the embodiments of the invention are not limited to the scenario above.

Specific implementations of a method, an apparatus and a device for detecting a lane line according to the embodiments of the present disclosure are described in detail hereinafter in conjunction with the drawings and the embodiments.

Figure 2:
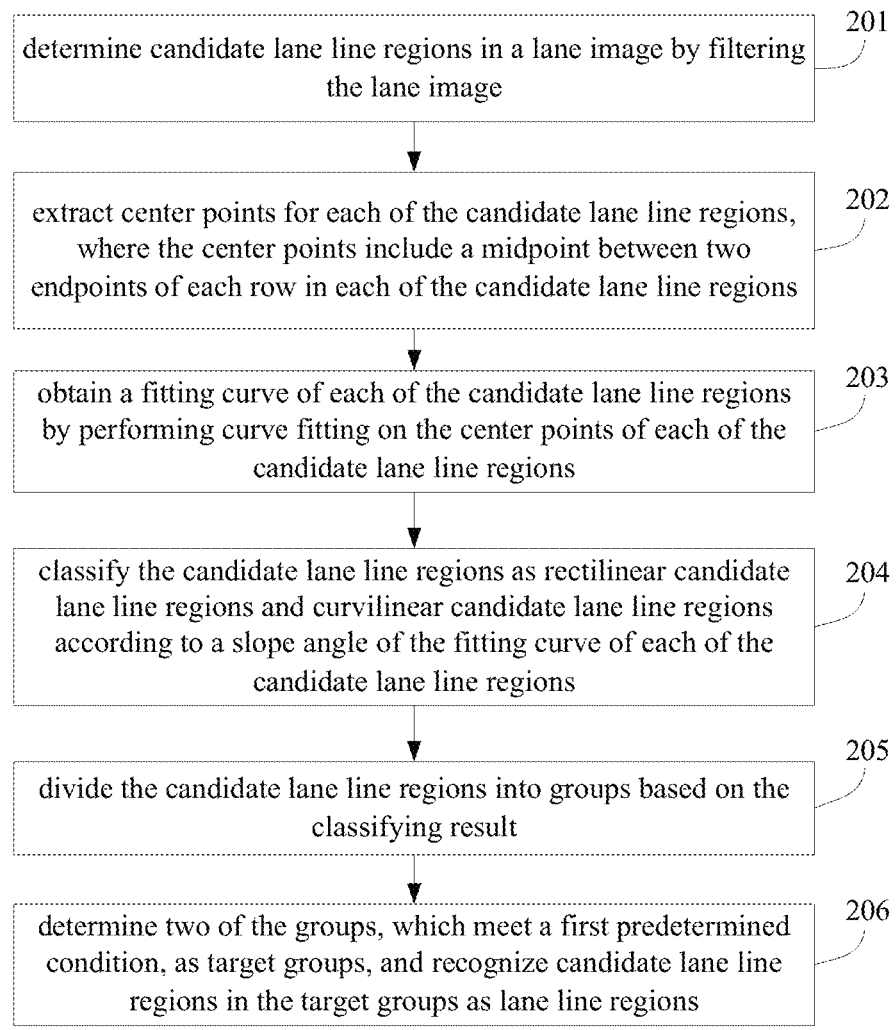
FIG. 2 is a flowchart of a method for detecting a lane line according to an embodiment of the invention.

Reference is made to FIG. 2, which shows a flowchart of a method for detecting a lane line according to an embodiment of the invention. In the embodiment, the method may include the following steps 201 to 206, for example.

In step 201, candidate lane line regions in a lane image are determined by filtering the lane image.

In practical implementations, for a lane image obtained, the lane image may be converted into a grayscale image, the grayscale image is filtered and filtered regions obtained are determined as candidate lane line regions. Understandably, obtaining the filtered regions by filtering the lane image may be implemented by any means. For example, the lane image may be filtered with some conventional techniques, which are not redundantly described here in the embodiment.

In step 202, center points are extracted for each of the candidate lane line regions, where the center points include a midpoint between two endpoints of each row in each of the candidate lane line regions.

Understandably, the entire lane image consists of multiple rows of pixels. Each candidate lane line region is a region in the lane image, that is, each candidate lane line region in fact occupies some rows of pixels in the lane image. For a candidate lane line region, there are a left endpoint and a right endpoint in each row of pixels occupied by the candidate lane line region, and a midpoint between the left endpoint and the right endpoint of each row is a center point of the candidate lane line region.

Figure 3:
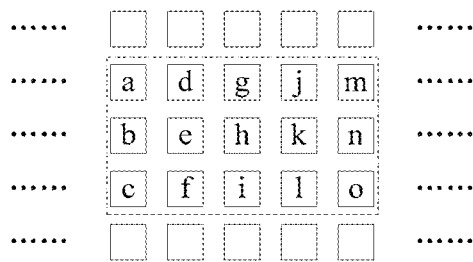
FIG. 3 is a schematic diagram of an example of candidate lane line regions in a lane image according to an embodiment of the invention.

For example, in the example image shown in FIG. 3, each square represents a pixel in the image, where a region within the dotted box is a candidate lane line region. The candidate lane line region includes pixels a to o. Pixels a, d, g, j and m are located in a row. In the row, a left endpoint is a, a right endpoint is m and a midpoint between them is g. Pixels b, e, h, k and n are in a row. In the row, a left endpoint is b, a right endpoint is n and a midpoint between them is h. Pixels c, f, i, l and o are in a row. In the row, a left endpoint is c, a right endpoint is o and a midpoint between them is i. Thus, center points of the candidate lane line region include g, h and i.

Understandably, a real lane line region generally occupies a considerable number of rows of pixels, an unreal lane line region may occupy few rows of pixels, and the number of center points can represent the number of rows occupied by a candidate lane line region. Thus, after the center points are extracted for each candidate lane line region, before subsequent processing is performed, some candidate lane line regions with few center points may be filtered out, to filter out some noise regions from the candidate lane line regions obtained by filtering. Specifically, in some implementations of the embodiment, after step 202, the method may further, for example, include: recognizing the number of effective pixels in the center points as an effective pixel number, for each of the candidate lane line regions; and filtering out candidate lane line regions with effective pixel numbers beyond a predetermined range of number, and performing step 203 on the remaining candidate lane line regions. The predetermined range of number may be a number threshold, and in a case that the number of effective pixels in a candidate lane line region is smaller than the number threshold, the candidate lane line region can be filtered out.

In step 203, a fitting curve of each of the candidate lane line regions is obtained by performing curve fitting on the center points of each of the candidate lane line regions.

Understandably, for a candidate lane line region, curve fitting may be performed on center points thereof through any possible implementation, to obtain a fitting curve of the candidate lane line region.

For example, in a specific example of the curve fitting, in order that a fitting curve can be more close to the shape of a candidate lane line region, some control points can be selected from center points of the candidate lane line region and the curve fitting can be performed based on the control points. Specifically, in some implementations of the embodiment, step 203 may, for example, include: selecting multiple control points from the center points of each of the candidate lane line regions, where the control points include center points at two ends of each of the candidate lane line regions; obtaining curve equations of pairs of adjacent control points in each of the candidate lane line regions by perform fitting on the control points of each of the candidate lane line regions through cubic spline interpolation; and forming the fitting curve of each of the candidate lane line regions with the curve equations of the pairs of adjacent control points of each of the candidate lane line regions. The two ends of each of the candidate lane line regions are two edges of each of the candidate lane line regions in a vertical direction, and the center points at the two ends of each of the candidate lane line regions are center points of the two edges of each of the candidate lane line regions in the vertical direction. In other words, a center point with a maximum vertical coordinate and a center point with a minimum vertical coordinate of all the center points of each of the candidate lane line regions are the center points at the two ends of each of the candidate lane line regions.

Figure 4:
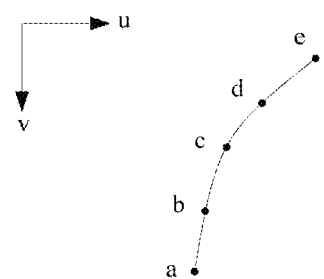
FIG. 4 is a schematic diagram of an example of line segments formed with center points of a candidate lane line region according to an embodiment of the invention.

For example, in the example shown in FIG. 4, the line segment between a and e can be regarded as a line segment formed by center points of a candidate lane line region.

Supposing that center points a, b, c, d and e in the candidate lane line region are selected as the control points, a curve equation of a line segment between a and b, a curve equation of a line segment between b and c, a curve equation of a line segment between c and d, and a curve equation of a line segment between d and e can be obtained by performing curve fitting on the control points a, b, c, d and e, and a curve equation corresponding to the candidate lane line region can be formed by combining the curve equations of the four line segments together, that is, forming the fitting curve of the candidate lane line region, where center points a and e are center points at two ends of the candidate lane line region.

Understandably, fitting may be performed on the control points of the candidate lane line region with curves of various forms. For example, fitting may be performed on the control points of the candidate lane line region with the cubic equation according to formula 1:

$$v = a_l u^3 + b_l u^2 + c_l u + d_l.\qquad\text{formula 1:}$$

Formula 1 represents the curve equation of the first line segment in the candidate lane line region. In the curve equation, v and u are vertical coordinate and horizontal coordinate in an image coordinate system built based on the lane image, and $a_l$, $b_l$, $c_l$ and $d_l$ are parameters of the curve equation.

It should be noted that in a case that there is an inflection point in center points of a candidate lane line region, sections of the candidate lane line region at two sides of the inflection point have highly different shapes, and should be described with different fitting curves. In order that the fitting curve can be adaptive regardless of whether there is an inflection point or not, in some implementations of the embodiment, the control points may be selected in different ways depending on whether there is an inflection point in the center points of the candidate lane line region. Specifically, the selecting multiple control points from the center points of each of the candidate lane line regions may, for example, include: determining whether there is an inflection point in the center points of each of the candidate lane line regions, where the inflection point is a peak point or a valley point; in response to no inflection point being in the center points of a candidate lane line region, selecting first target points from the candidate lane line region as the control points; and in response to an inflection point being in the center points of the candidate lane line region, selecting second target points from the candidate lane line region as the control points. Distances between the pairs of adjacent first target points in the candidate lane line region are equal to each other, and the first target points of the candidate lane line region include center points at two ends of the candidate lane line region. The second target points as the control points of the candidate lane line region include center points at two ends of the candidate lane line region and the inflection point, distances between any adjacent two second target points located between a center point at a first end of the candidate lane line region and the inflection point are equal to each other, and distances between any adjacent two second target points located between a center point at a second end of the candidate lane line region and the inflection point are equal to each other.

Figure 5:
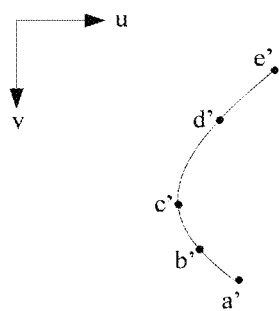
FIG. 5 is a schematic diagram of an example of line segments formed with center points of a candidate lane line region according to another embodiment of the invention.

For example, in the example shown in FIG. 4, the line segment between a and e can be regarded as a line segment formed by center points of a candidate lane line region. As there is no inflection point in the center points of the candidate lane line region, a, b, c, d and e can be selected as the control points from the center points of the candidate lane line region, that is, the first target points include a, b, c, d and e. A distance between a and b, a distance between b and c, a distance between c and d, and a distance between d and e are equal. In the example shown in FIG. 5, the line segment between a' and e' can be regarded as a line segment formed by center points of a candidate lane line region, and as there is an inflection point c' in the center points of the candidate lane line region, a', b', c', d' and e' can be selected as the control points from the center points of the candidate lane line region, that is, the second target points include a', b', c', d' and e'. Here, a' is a center point at a first end of the candidate lane line region, e' is a center point at a second end of the candidate lane line region, a distance between a' and b' and a distance between b' and c' are equal, and a distance between c' and d' and a distance between d' and e' are equal.

Figure 6:
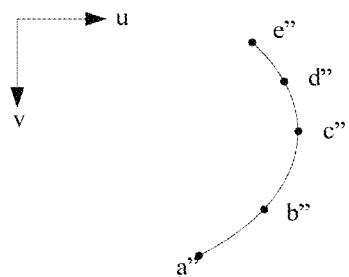
FIG. 6 is a schematic diagram of an example of line segments formed with center points of a candidate lane line region according to yet another embodiment of the invention.

Understandably, in center points of a candidate lane line region, an inflection point is a peak point or a valley point with respect to horizontal coordinate. Specifically, in an image coordinate system built based on the lane image, both a horizontal coordinate peak point and a horizontal coordinate valley point in center points of a candidate lane line region are inflection points of the candidate lane line region. For a candidate lane line region, the horizontal coordinates of center points at two sides of a horizontal coordinate peak point are all smaller than the horizontal coordinate of the horizontal coordinate peak point, and the horizontal coordinates of center points at two sides of a horizontal coordinate valley point are all greater than the horizontal coordinate of the horizontal coordinate valley point. For example, in the example shown in FIG. 5, the line segment between a' and e' can be regarded as a line segment formed by center points of a candidate lane line region. In the center points of the candidate lane line region, c' is a horizontal coordinate valley point. For another example, in the example shown in FIG. 6, the line segment between a" and e" can be regarded as a line segment formed by center points of a candidate lane line region. In the center points of the candidate lane line region, c" is a horizontal coordinate peak point.

In the embodiment, whether there is an inflection point in the center points of a candidate lane line region can be determined through various implementations. For example, in some implementations of the embodiment, whether there is an inflection point in a candidate lane line region may be determined in the following way: searching for a third target point with a maximum horizontal coordinate and a fourth target point with a minimum horizontal coordinate in the center points of the candidate lane line region; in response to the third target point and the fourth target point meeting a fifth predetermined condition or a sixth predetermined condition, determining that there is an inflection point in the center points of the candidate lane line region; and in response to the third target point and the fourth target point meeting neither the fifth predetermined condition nor the sixth predetermined condition, determining that there is no inflection point in the center points of the candidate lane line region. The fifth predetermined condition is as follows: the third target point is in the middle of the candidate lane line region and the fourth target point is in either one of two ends of the candidate lane line region, and the sixth predetermined condition is as follows: the fourth target point is in the middle of the candidate lane line region and the third target point is in either one of the two ends of the candidate lane line region. Understandably, the horizontal coordinate herein is the horizontal coordinate in the image coordinate system described above.

More specifically, the fifth predetermined condition may be expressed by formulas 2 and 3:

$$\text{NumThre} < l\,\text{max} < N - \text{NumThre; and} \qquad \text{formula 2:}$$

$$l\,\text{min} \le \text{NumThre or } l\,\text{min} \ge N - \text{NumThre.} \qquad \text{formula 3:}$$

The sixth predetermined condition may be expressed by formulas 4 and 5:

$$\text{NumThre} < l\,\text{min} < N - \text{NumThre; and} \qquad \text{formula 4:}$$

$$l\,\text{max} \le \text{NumThre or } l\,\text{max} \ge N - \text{NumThre.} \qquad \text{formula 5:}$$

N represents the number of center points in a candidate lane line region, NumThre represents a predetermined number threshold, l max represents a vertical serial number of a third target point in the center points of the candidate lane line region, and l min represents a vertical serial number of a fourth target point in the center points of the candidate lane line region. For example, in the image coordinate system built based on the lane image, supposing the center points of the candidate lane line region are a, b, c, d and e in an order of smallest to largest vertical coordinate, the vertical serial number of a is 1, the vertical serial number of b is 2, the vertical serial number of c is 3, the vertical serial number of d is 4, and the vertical serial number of e is 5. Supposing a is the third target point with a maximum horizontal coordinate and c is the fourth target point with a minimum horizontal coordinate, l max is the vertical serial number of a, that is, 1, and l min is the vertical serial number of c, that is, 3.

For a candidate lane line region, in a case that a third target point and a fourth target point thereof meet both of formulas 2 and 3, the third target point and the fourth target point meet the fifth predetermined condition and there is a peak point in center points of the candidate lane line region. In a case that the third target point and the fourth target point thereof do not meet any one or both of formulas 2 and 3, the third target point and the fourth target point do not meet the fifth predetermined condition and there is no peak point in the center point of the candidate lane line region. Similarly, in a case that the third target point and the fourth target point thereof meet both of formulas 4 and 5, the third target point and the fourth target point meet the sixth predetermined condition and there is a valley point in the center points of the candidate lane line region. In a case that the third target point and the fourth target point thereof do not meet any one or both of formulas 4 and 5, the third target point and the fourth target point do not meet the sixth predetermined condition and there is no valley point in the center points of the candidate lane line region. Further, in a case that there is a peak point or a valley point in the center points of the candidate lane line region, the peak point or the valley point is an inflection point thereof. In a case that there is no peak point or valley point in the center points of the candidate lane line region, there is no inflection point in the candidate lane line region.

Understandably, after the fitting curve of each of the candidate lane line regions is obtained in step 203, step 204 may be performed to classify the candidate lane line regions as rectilinear candidate lane line regions and curvilinear candidate lane line regions. That is to say, the fitting curves obtained in step 203 are used to classify shapes of the candidate lane line regions. A candidate lane line region can be recognized as a rectilinear candidate lane line region or a curvilinear candidate lane line region based on the fitting curve thereof.

Further, in some implementations of the embodiment, before performing step 204, some rectilinear candidate lane line region may be recognized based on real lengths of the candidate lane line regions and whether there is an inflection point, for example. In this way, shapes of candidate lane line regions with small real lengths and without inflection point do not need to be determined with fitting curves. And thus, the number of the candidate lane line regions, shapes of which need to be determined with fitting curves, are reduced, thereby reducing consumption of computation resources. Specifically, the method according to the embodiment may, for example, further include: calculating a real length of each of the candidate lane line regions and determining whether there is an inflection point in the center points of each of the candidate lane line regions, where the inflection point is a peak point or a valley point; and recognizing the candidate lane line regions, real lengths of which are within a predetermined range of length and the center points of which do not include an inflection point, as rectilinear candidate lane line regions, and performing step 204 with the rest of the candidate lane line regions. The predetermined range of length may be represented by a length threshold, and in a case that a real length of a candidate lane line region is smaller than the length threshold, the real length is within the predetermined range of length.

In step 204, the candidate lane line regions are classified as rectilinear candidate lane line regions and curvilinear candidate lane line regions according to a slope angle of the fitting curve of each of the candidate lane line regions.

Understandably, a shape of a candidate lane line region corresponds to a shape of a lane line to which the candidate lane line region corresponds. Specifically, in a case that a candidate lane line region is rectilinear, a lane line corresponding to the candidate lane line region can be regarded as a straight line, and in a case that the candidate lane line region is curvilinear, the lane line corresponding to the candidate lane line region can be regarded as curve.

For a candidate lane line region, a shape of the candidate lane line region can be determined according to slope angles at different positions of the fitting curve thereof. For example, in some implementations of the embodiment, three sampling points can be selected from the center points of the candidate lane line region, slope angles of the fitting curve at the three sampling points are calculated and the shape of the candidate lane line region can be determined according to the slope angles at the three sampling points. Specifically, step 204 may, for example, include: selecting a first sampling point, a second sampling point and a third sampling point from the center points of each of the candidate lane line regions; calculating slope angles of the fitting curve at the first sampling point, the second sampling point and the third sampling point as a first slope angle, a second slope angle and a third slope angle, for each of the candidate lane line regions; and recognizing, based on the first slope angle, the second slope angle and the third slope angle of each of the candidate lane line regions, ones of the candidate lane line regions which meet a third predetermined condition or a fourth predetermined condition as curvilinear candidate lane line regions and other ones of the candidate lane line regions which meet neither the third predetermined condition nor the fourth predetermined condition as rectilinear candidate lane line regions. The third predetermined condition is as follows: both a difference between the first slope angle and the second slope angle of a candidate lane line region and a difference between the second slope angle and the third slope angle of the candidate lane line region are greater that a first slope angle threshold, and the fourth predetermined condition is as follows: a difference between the first slope angle and the second slope angle of a candidate lane line region is smaller than the first slope angle threshold and a difference between the second slope angle and the third slope angle of the candidate lane line regions is greater than a second slope angle threshold. The first slope angle threshold is smaller than the second slope angle threshold. Understandably, the first sampling point, the second sampling point and the third sampling point may be located in an order of greatest to smallest vertical coordinate in the image coordinate system, that is, the first sampling point, the second sampling point and the third sampling point are located from the near to the distant with respect to a current location of a vehicle.

More specifically, the first slope angle, the second slope angle and the third slope angle can be calculated according to formula 6:

$$\theta_i = \arctan k_i, i=0,1,2, \qquad \text{formula 6:}$$

where $\theta_0$, $\theta_1$ and $\theta_2$ represent the first slope angle, the second slope angel and the third slope angle, respectively, $k_0$, $k_1$ and $k_2$ represent a first slope, a second slope and a third slope, respectively. The first slope is a slope of a tangent of the fitting curve of a candidate lane line region at the first sampling point, the second slope is a slope of a tangent of the fitting curve of the candidate lane line region at the second sampling point and the third slope is a slope of a tangent of the fitting curve of the candidate lane line region at the third sampling point.

Besides, the third predetermined condition can be expressed by formulas 7 and 8:

$$\theta_2 - \theta_1 \geq \theta_{thre1} \text{ and } \theta_1 - \theta_0 \geq \theta_{thre1}; \text{ and} \qquad \text{formula 7:}$$

$$\theta_1 - \theta_2 \geq \theta_{thre1} \text{ and } \theta_0 - \theta_1 \geq \theta_{thre1}. \qquad \text{formula 8:}$$

The fourth predetermined condition can be expressed by formulas 9 and 10:

$$0 \leq \theta_1 - \theta_0 \leq \theta_{thre1} \text{ and } \theta_2 - \theta_1 \geq \theta_{thre2}; \qquad \text{formula 9:}$$

$$0 \leq \theta_0 - \theta_1 \leq \theta_{thre1} \text{ and } \theta_1 - \theta_2 \geq \theta_{thre2}. \qquad \text{formula 10:}$$

$\theta_{thre1}$ represents the first slope angle threshold, $\theta_{thre2}$ represents the second slope angle threshold and $\theta_{thre1}$ is smaller than $\theta_{thre2}$. Specifically, $\theta_{thre1}$ may be 3°, for example, and $\theta_{thre2}$ may be 8°, for example.

For a candidate lane line region, in a case that the candidate lane line region meets formula 7 or 8, the candidate lane line region meet the third predetermined condition and can be determined as a curvilinear candidate lane line region. Similarly, in a case that the candidate lane line region meets formula 9 or 10, the candidate lane line region meets the fourth predetermined condition and can be determined as a curvilinear candidate lane line region. In a case that the candidate lane line region meets none of formula 7, 8, 9 and 10, the candidate lane line region meets neither the third predetermined condition nor the fourth predetermined condition and can be determined as a rectilinear candidate lane line region.

It should be noted that in a case that there is an inflection point in center points of a candidate lane line region, sections of the candidate lane line region at two sides of the inflection point have highly different shapes. Therefore, whether there is an inflection point can affect determination of the shape of the candidate lane line region. Thus, in some implementation of the embodiment, the sampling points may be selected in different ways depending on whether there is an inflection point in the center points of the candidate lane line region. Specifically, selecting a first sampling point, a second sampling point and a third sampling point from the center points of each of the candidate lane line regions may, for example, include: determining whether there is an inflection point in the center points of each of the candidate lane line regions, where the inflection point is a peak point or a valley point; in response to no inflection point being in the center points of a candidate lane line region, selecting any three center points from the candidate lane line region as the first sampling point, the second sampling point and the third sampling point of the candidate lane line region; and in response to an inflection point being in the center points of the candidate lane line region, determining the inflection point in the candidate lane line region as the second sampling point of the candidate lane line region and selecting two center points at two sides of the second sampling point in the candidate lane line region as the first sampling point and the third sampling point of the candidate lane line region. The first sampling point and the third sampling point may be center points at two ends of the candidate lane line region, for example.

For example, in the example shown in FIG. 4, the line segment between a and e can be regarded as a line segment formed by center points of a candidate lane line region. As there is no inflection point in the center points of the candidate lane line region, a, c and e can be selected from the center points of the candidate lane line region as the sampling points, that is, a is the first sampling point, c is the second sampling point and e is the third sampling point. In the example shown in FIG. 5, the line segment between a' and e' can be regarded as a line segment formed by center points of a candidate lane line region, and as there is an inflection point c' in the center points of the candidate lane line region, a', c' and e' can be selected from the center points of the candidate lane line region as the sampling points, that is, a' is the first sampling point, c' is the second sampling point and e' is the third sampling point.

Besides, reference can be made to detailed descriptions of step 203 in the embodiment for introduction of an inflection point and how to determine whether there is an inflection point in the center points of each of the candidate lane line regions, which are not redundantly described herein.

In step 205, the candidate lane line regions are divided into groups based on the classifying result, where each curvilinear candidate lane line region alone forms a group, one or more rectilinear candidate lane line regions form a group and candidate lane line regions in the same group correspond to the same lane line.

Understandably, the candidate lane line regions in the lane image can be divided into different groups according to the shapes of the candidate lane line regions, so that candidate lane line regions corresponding to different lane lines can be divided into different groups. In this way, each group corresponds to a possible lane line, candidate lane line regions in the same group correspond to the same possible lane line and candidate lane line regions in different groups do not correspond to the same lane line.

In practical implementations, in a case that there are curvilinear candidate lane line regions in the lane image, each curvilinear candidate lane line region can be put into a group alone, so that each group only includes one curvilinear candidate lane line region. For rectilinear candidate lane line regions in the lane image, the rectilinear candidate lane line regions can be divided into groups according to a second predetermined condition, for example. Specifically, two rectilinear candidate lane line regions which meet the second predetermined condition are in the same group.

The second predetermined condition may be a condition for limiting a positional relationship and a direction deviation between two rectilinear candidate lane line regions. Specifically, the second predetermined condition may include: fitting line segments of the two rectilinear candidate lane line regions do not overlap each other in a vertical direction, a distance between center points, closest to each other in the vertical direction, of the two rectilinear candidate lane line regions is within a second predetermined range of distance, and a directional deviation between the fitting line segments of the two rectilinear candidate lane line regions is within a predetermined range of deviation, where the fitting line segments of the rectilinear candidate lane line regions are obtained by performing rectilinear fitting on center points of the rectilinear candidate lane line regions. For example, a fitting line segment of a rectilinear candidate lane line region can be obtained by performing a fitting calculation on center points of the rectilinear candidate lane line region with the least square algorithm of RANSAC (random sample consensus).

Understandably, in the second predetermined condition, limitation on the positional relationship of the two rectilinear candidate lane line regions can be described through a world coordinate system. Specifically, that the fitting line segments of the two rectilinear candidate lane line regions do not overlap each other in the vertical direction may represent that ranges of vertical coordinates of the two rectilinear candidate lane line regions do not overlap each other in the world coordinate system built based on the real world. That the distance between center points, closest to each other in the vertical direction, of the two rectilinear candidate lane line regions is within the second predetermined range of distance may represent that a distance between two endpoints, closest to each other, of the two rectilinear candidate lane line regions in the world coordinate system built based on the real world.

More specifically, the limitation on the positional relationship according to the second predetermined condition can be expressed by formulas 11 and 12:

$$z_{S1} > z_{E0}; \text{ and} \quad \text{formula 11:}$$

$$\text{MIN BLANK} < S < \text{MAX BLANK}. \quad \text{formula 12:}$$

Region 1 and region 0 represent the two rectilinear candidate lane line regions involved in the second predetermined condition, $z_{S1}$ represents a vertical coordinate of a start point of the fitting line segment of region 1 in the world coordinate system, $z_{E0}$ represents a vertical coordinate of an end point of the fitting line segment of region 0 in the world coordinate system, S represents a distance between the start point of the fitting line segment of region 1 and the end point of the fitting line segment of region 0 in the world coordinate system, MINBLANK represents a minimum distance threshold, MAXBLANK represents a maximum distance threshold, and MINBLANK and MAXBLANK may be determined according to a design standard of road lanes.

Understandably, region 1 is a region, far away from the current position of the vehicle, of the two rectilinear candidate lane line regions, and region 0 is a region, close to the current position of the vehicle, of the two rectilinear candidate lane line regions. For a fitting line segment, a start point thereof is an endpoint, close to the current position of the vehicle, of two endpoints of the fitting line segment, and an end point thereof is an endpoint, far away from the current position of the vehicle, of the two endpoints of the fitting line segment. That is to say, the start point of the fitting line segment of region 1 and the end point of the fitting line segment of region 0 are in fact two center points of regions 1 and 0, which are closest to each other in the vertical direction.

Figure 7:
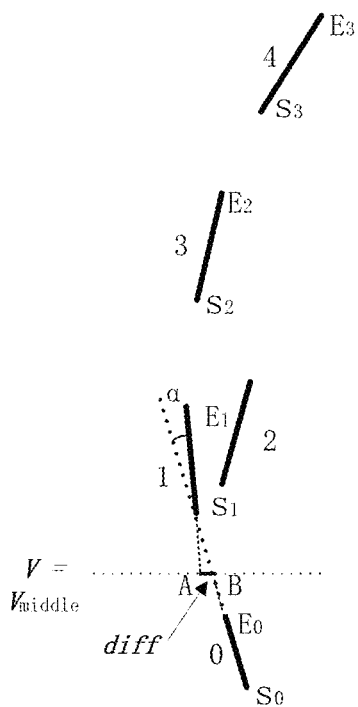
FIG. 7 is a schematic diagram of an example of grouping of rectilinear candidate lane line regions according to an embodiment of the invention.

For example, in the example grouping shown in FIG. 7, line segment "0" can server as the fitting line segment of region 0, and line segment "1" can serve as the fitting line segment of region 1. $E_0$ represents the end point of the fitting line segment of region 0, $S_1$ represents the start point of region 1, $E_0$ and $S_1$ are two closest center points of the two regions in the vertical direction, a distance between $E_0$ and $S_1$ can serve as S in formula 12, and vertical coordinates of $E_0$ and $S_1$ in the world coordinate system can serve as $z_{E0}$ and $z_{S1}$ in formula 11.

It should be noted that in the second predetermined condition, limitation on the directional deviation of the two rectilinear candidate lane line regions may be described in many ways. For example, in some implementations, that a directional deviation between the fitting line segments of the two rectilinear candidate lane line regions is within a predetermined range of deviation may include any one or more of the following:

condition a: an included angle of the fitting line segments of the two rectilinear candidate lane line regions is within a second predetermined range of included angle;

condition b: an estimated real included angle of the two rectilinear candidate lane line regions is within a third predetermined range of included angle; and condition c: a deviation distance between the fitting line segments of the two rectilinear candidate lane line regions is within a third predetermined range of distance.

Condition a can be expressed by formula 13:

$$\text{abs}|\alpha| < \text{Thre}_\alpha, \alpha = \arctan(k_1) - \arctan(k_0). \quad \text{formula 13:}$$

Condition b can be expressed by formula 14:

$$\text{abs}|\beta| < \text{Thre}_\beta, \text{Thre}_\beta = 360 \times S/2\pi R. \quad \text{formula 14:}$$

And condition c can be expressed by formula 15:

$$\text{abs}|\text{diff}| < \text{Thre}_{\text{diff}}. \quad \text{formula 15:}$$

Regions 1 and 0 represents the two rectilinear candidate lane line regions involved in the second predetermined condition, α represents an included angle of the fitting line segment of region 1 and the fitting line segment of region 0 in the image coordinate system, $k_1$ represents a slope of the fitting line segment of region 1, $k_0$ represents a slope of the fitting line segment of region 0, $\text{Thre}_\alpha$ represents a included angle threshold for describing the second predetermined range of included angle, β represents an included angle of the fitting line segment of region 1 and the fitting line segment of region 0 in the world coordinate system (that is, an estimated real included angle), S is the same as the S according to formula 12, R represents a predetermined minimum turning radius, $\text{Thre}_\beta$ represent a included angle threshold for describing the third predetermined range of included angle, diff represents a deviation distance between the fitting line segment of region 1 and the fitting line segment of region 0, and $\text{Thre}_{\text{diff}}$ represents a distance threshold for describing the third predetermined range of distance. For example, R may be 125 m, $\text{Thre}_{\text{diff}}$ may be 0.25 m, $\text{Thre}_\alpha$ may be 30°, and $\text{Thre}_\beta$ may be determined based on β, for example, according to the equation $\text{Thre}_\beta = \text{int } \beta + 2$.

Understandably, the deviation distance is a distance between a first intersection point and a second intersection point. The first intersection point and the second intersection point are intersection points of extension lines of the fitting line segments of the two rectilinear candidate lane line regions and a horizontal midline, respectively. Distances from center points, closest to each other in the vertical direction, of the two rectilinear candidate lane line regions to the horizontal midline are equal.

For example, in the example grouping shown in FIG. 7, line segment "0" can server as the fitting line segment of region 0, and line segment "1" can serve as the fitting line segment of region 1. $E_0$ represents the end point of the fitting line segment of region 0, $S_1$ represents the start point of region 1, $E_0$ and $S_1$ are two closest center points of the two regions in the vertical direction. A distance between $E_0$ and a dotted line "$V=V_{middle}$" is equal to a distance between $S_1$ and the dotted line, that is, the dotted line "$V=V_{middle}$" is a horizontal midline corresponding to the two regions. Point A is an intersection point of an extension line of the fitting line segment of region 1 and the horizontal midline, that is, the first intersection point. Point B is an intersection point of an extension line of the fitting line segment of region 0 and the horizontal midline, that is, the second intersection point. Thus, a distance between points A and B is the deviation distance between fitting line segments of regions 1 and 0.

Figure 8:
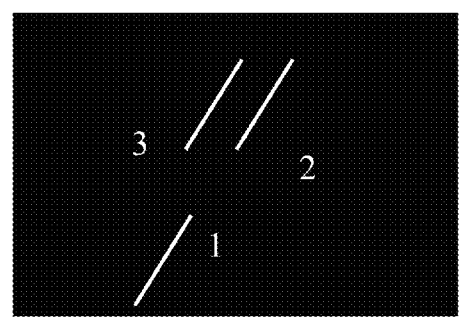
FIG. 8 is a schematic diagram of an example distribution of fitting line segments of candidate lane line regions in a lane image according to an embodiment of the invention.

There are some regions which correspond to no lane line in a lane image sometimes, and fitting line segments of these regions are approximately parallel to those of the regions corresponding to lane lines, that is, having close slopes. For example, in the exemplary fitting line segments of candidate lane line regions shown in FIG. 8, line segments "1" and "2" are of lane line regions corresponding to the same lane line, line segment "3" is a fitting line segment of a region corresponding to a fence, and line segment "3" is almost parallel with segments "1" and "2", having very close slopes. In order to prevent a region corresponding to no line region and a region corresponding to a lane line from being grouped into the same group, in some implementations of the embodiment, the second predetermined condition may further include condition d, for example.

Condition d is as follows: in a case that the included angle of the fitting line segments of the two rectilinear candidate lane line regions is within a fourth predetermined range of included angle, the deviation distance between the fitting line segments of the two rectilinear candidate lane line regions is within a fourth predetermined range of distance, where the second predetermined range of included angle is wider than the fourth predetermined range of included angle and the third predetermined range of distance is wider that the fourth predetermined range of distance.

Specifically, condition can be expressed by formula 16:

if(abs|α|<Thre$_{\alpha 0}$){abs|diff|<Thre$_{diff\,0}$}.      formula 16:

Reference can be made to the descriptions of formulas 13 to 15 for α and diff, Thre$_{\alpha 0}$ represents a included angle threshold for describing the fourth predetermined range of included angle, and Thre$_{diff\,0}$ represents a distance threshold for describing the fourth predetermined range of distance. In order that the second predetermined range of included angle is wider than the fourth predetermined range of included angle, Thre$_{\alpha 0}$ may be smaller than Thre$_{\alpha}$, and in order that the third predetermined range of distance is wider than the fourth predetermined range of distance, Thre$_{diff\,0}$ may be smaller than Thre$_{diff}$.

It should be noted that for any two rectilinear candidate lane line regions in the lane image, in a case that the two rectilinear candidate lane line regions meet the second predetermined condition, the two rectilinear candidate lane line regions correspond to the same possible lane line and can be arranged into the same group. For example, in the exemplary grouping shown in FIG. 7, each solid line segment represents a fitting line segment of a rectilinear candidate lane line region. In a case that line segments "0" and "1" meet the second predetermined condition, candidate lane line regions corresponding to line segments "0" and "1" are grouped into the same group. In a case that line segments "1" and "2" fail to meet the second predetermined condition, candidate lane line regions corresponding to line segments "1" and "2" are divided into different groups. In a case that line segments "1" and "3" meet the second predetermined condition, candidate lane line regions corresponding to line segments "1" and "3" are grouped into the same group. Understandably, with line segments "0" and "1" meeting the second predetermined condition and line segments "1" and "3" also meeting the second predetermined condition, even though line segments "0" and "3" fail to meet the second predetermined condition, line segments "0" and "3" are in fact grouped into the same group, for the candidate lane line regions corresponding to line segments "0" and "1" are grouped into the same group and the candidate lane line regions corresponding to line segments "1" and "3" are also grouped into the same group. That is, line segments "0", "1" and "3" are in fact grouped into the same group.

Understandably, there are often multiple rectilinear candidate lane line regions in a lane image. The rectilinear candidate lane line regions may be divided into groups in a certain order. For example, in some implementations of the embodiment, all the rectilinear candidate lane line regions in the lane image can be arranged and assigned with serial numbers in an order that start points of fitting line segments of the rectilinear candidate lane line regions are located from the near to the distant relative to the current position of the vehicle. Thereafter, in an order from smallest to greatest in serial number, two rectilinear candidate lane line regions are selected each time to determine whether they meet the second predetermined condition. In a case that the two rectilinear candidate lane line regions meet the second predetermined condition, the two rectilinear candidate lane line regions are grouped into the same group. Specifically, step 205 may be implemented through the following steps according to the embodiment, for example:

step A, for all rectilinear candidate lane line regions in the lane image, which have not been grouped, arranging the rectilinear candidate lane line regions and assigning serial numbers to the rectilinear candidate lane line regions in an order that the start points of the fitting line segments of the rectilinear candidate lane line regions are located from the near to the distant relative to the current position of the vehicle;

step B, letting i=0 and j=i+1, establishing a new group as a current group and adding a rectilinear candidate lane line region with a serial number of i into the current group;

step C, determining whether two rectilinear candidate lane line regions with serial numbers of i and j meet the second predetermined condition, entering step D in a case that the second predetermined condition is met and entering step G in a case that the second predetermined condition is not met, specifically, determining whether formulas 11 to 16 are satisfied for the two rectilinear candidate lane line regions, where it is determined that the two rectilinear candidate lane line regions meet the second predetermined condition in a case that formula 11 to 16 are satisfied;

step D, determining the rectilinear candidate lane line region with a serial number of j as a region to be confirmed;

step E, determining whether j is equal to N, entering step F in a case that j is not equal to N and entering step I in a case that j is equal to N, where N represents the total number of the rectilinear candidate lane line regions;

step F, determining whether two rectilinear candidate lane line regions with serial numbers of j+1 and j overlap each other in the vertical direction, entering step H in a case that the two rectilinear candidate lane line regions with serial numbers of j+1 and j overlap each other in the vertical direction and entering step I in a case that the two rectilinear candidate lane line regions with serial numbers of j+1 and j do not overlap each other in the vertical direction;

step G, determining whether j is equal to N, entering step H in a case that j is not equal to N and entering step I in a case that j is equal to N;

step H, letting i=i and j=j+1 and returning to step C;

step I, in a case the number of regions to be confirmed currently is 0, directly entering step J; in a case that the number of regions to be confirmed currently is 1, entering step J after determining the regions to be confirmed as target regions, adding the regions to be confirmed into the current group and clearing the regions to be confirmed currently in record; and in a case that the number of regions to be confirmed currently is greater than 1, entering step J after comprehensively analyzing center point uniformity of the regions to be confirmed, slope differences between edge points at two sides of the regions to be confirmed and degrees of saturation of filtered regions, selecting a target region from the regions to be confirmed, adding the target region in the current group and clearing the regions to be confirmed currently in record;

step J, determining whether j is equal to N, entering step K in a case that j is not equal to N and entering step L in a case that j is equal to N;

step K, letting i be a maximum serial number of rectilinear candidate lane line regions in the current group and j=j+1, and returning to step C; and step L, returning to step A, the steps above are repeatedly performed until all the rectilinear candidate lane line regions in the lane image are divided into groups.

In step 206, two of the groups, which meet a first predetermined condition, are determined as target groups, and candidate lane line regions in the target groups are recognized as lane line regions.

The first predetermined condition may include at least one of the following: a distance between lane lines corresponding to the two groups is within a first predetermined range of distance, and an included angle of the lane lines corresponding to the two groups is within a first predetermined range of included angle.

Understandably, on one hand, two lane lines of the same lane are generally parallel with each other. In a case that an included angle of lane lines corresponding to two groups is within the first predetermined range of included angle, it is indicated that the lane lines corresponding to the two groups can be regarded to be approximately parallel. On the other hand, subject to the design standards for roads, a width of a lane is generally limited within a certain range, that is, a distance of lane lines of the same lane is limited within a certain range. Therefore, in a case that a distance between the lane lines corresponding to the two groups is within the first predetermined range of distance, it is indicated that the lane lines corresponding to the two groups meet lane distance requirements. Further, in a case that the lane lines corresponding to the two groups meet the requirements on ranges of include angle and distance, the lane lines corresponding to the two groups can be regarded as real lane lines and candidate lane line regions in the two groups are real lane line regions.

In some implementations of the embodiment, after determining the target groups and the lane line regions in step 205, fitting may be performed on the lane line regions in the target groups, to obtain a lane line in the lane image, where lane line regions in each target group are fitted into a lane line. Understandably, the fitting of the lane line regions may be implemented with an algorithm of cubic spline interpolation, for example.

Figure 9:
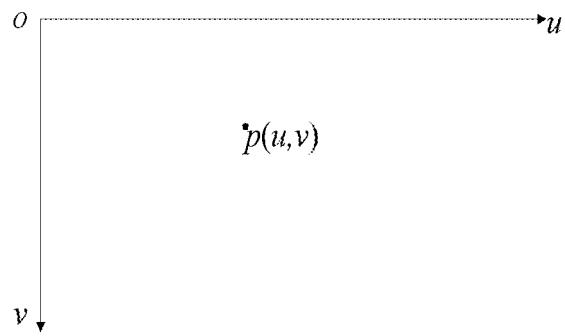
FIG. 9 is a schematic diagram of an example image coordinate system according to an embodiment of the invention.
Figure 10:
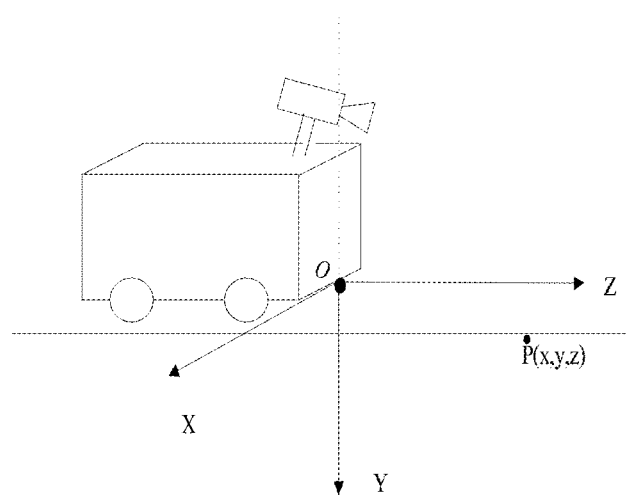
FIG. 10 is a schematic diagram of an example world coordinate system according to an embodiment of the invention.

Understandably, the image coordinate system built based on the lane image according to the embodiment is a plane coordinate system in a plane lane image, and an origin thereof may be located at the left top corner of the lane image, for example, as is shown in the coordinate system in FIG. 9. The world coordinate system built based on the real world may be a three-dimensional coordinate system in a three-dimensional space where the vehicle is located, and an origin thereof may be located at the position where a downward vertical line starting from the center of a camera intersects with the ground, for example, as is shown in the coordinate system in FIG. 10.

Figure 11:
FIG. 11 is a schematic diagram of a lane image in an exemplary application scenario according to an embodiment of the invention.
Figure 12:
FIG. 12 is a schematic diagram of filtered regions obtained by filtering a lane image in an exemplary application scenario according to an embodiment of the invention.
Figure 13:
FIG. 13 is a schematic diagram of filtered regions obtained by effective pixel number filtering of noise regions according to an embodiment of the invention.
Figure 14:
FIG. 14 is a schematic diagram of grouping of candidate lane line regions in an application scenario according to an embodiment of the invention.
Figure 15:
FIG. 15 is a schematic diagram of recognized lane line regions in an application scenario according to an embodiment of the invention.
Figure 16:
FIG. 16 is a schematic diagram of a lane image with lane lines highlighted in an application scenario according to an embodiment of the invention.

In order for those skilled in the art to better understand the image processing process according to the embodiment, the process is described taking an application scenario for example. In the application scenario, the lane image is shown in FIG. 11, and an image of filtered regions obtained by filtering in step 201 is shown in FIG. 12. An image of filtered regions obtained by performing effective pixel number filtering on noise regions is shown in FIG. 13, and the groups of the candidate lane line regions obtained by dividing in step 205 is shown in FIG. 14, where regions with the same grey level belong to the same group. The lane line regions obtained by matching in step 206 are shown in FIG. 15, and lane lines obtained by performing fitting on the lane line regions are shown in FIG. 16.

In the method according to the embodiment, the lane image is filtered to obtain filtered regions as the candidate lane line regions. The candidate lane line regions are classified as rectilinear candidate lane line regions and curvilinear candidate lane line regions based on the fitting curves of the candidate lane line regions and are divided into groups based on the classifying result, where the candidate lane line regions in each group form a lane line. Two of the groups, which correspond to lane lines matching each other, are determined as target groups. The candidate lane line regions in the target groups are recognized as the lane line regions. According to the above, after the candidate lane line regions are obtained by filtering the lane image, noise regions which do not correspond to real lane lines can be removed from the candidate lane line regions by grouping and matching of the candidate lane line regions, so that regions in the candidate lane line regions, which correspond to real lane lines, can be recognized as lane line regions, which makes detection of lane line regions more accurate and thus makes detection of lane information more accurate, thereby enabling a vehicle departure warning system to give a warning prompt accurately.

Figure 17:
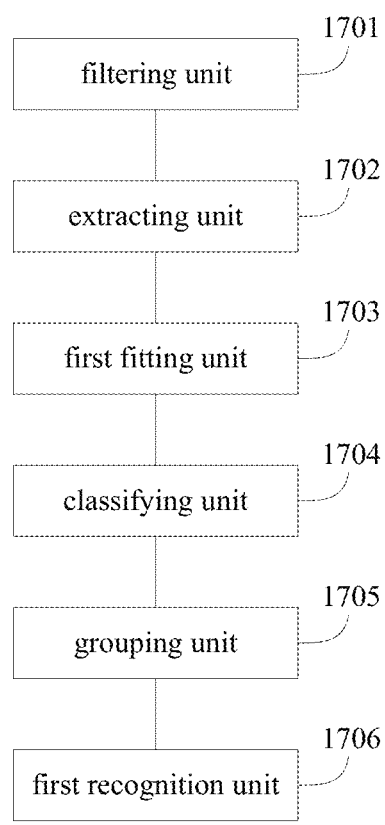
FIG. 17 is a schematic structural diagram of an apparatus for detecting a lane line according to an embodiment of the invention.

Reference is made to FIG. 17, which shows a schematic structural diagram of an apparatus for detecting a lane line according to an embodiment of the invention. In the embodiment, the apparatus may, for example, include:

a filtering unit 1701, configured to determine candidate lane line regions in a lane image by filtering the lane image;

an extracting unit 1702, configured to extract center points for each of the candidate lane line regions, where the center points include a midpoint between two endpoints of each row in each of the candidate lane line regions;

a first fitting unit 1703, configured to obtain a fitting curve of each of the candidate lane line regions by performing curve fitting on the center points of each of the candidate lane line regions;

a classifying unit 1704, configured to classify the candidate lane line regions as rectilinear candidate lane line regions and curvilinear candidate lane line regions according to a slope angle of the fitting curve of each of the candidate lane line regions;

a grouping unit 1705, configured to divide the candidate lane line regions into groups based on the classifying result, where each curvilinear candidate lane line region alone forms a group, one or more rectilinear candidate lane line regions form a group and candidate lane line regions in the same group correspond to the same lane line; and a first recognition unit 1706, configured to determine two of the groups which meet a first predetermined condition, as target groups and recognize candidate lane line regions in the target groups as lane line regions, where the first predetermined condition includes at least one of the following: a distance between lane lines corresponding to the two groups is within a first predetermined range of distance, and an included angle of the lane lines corresponding to the two groups is within a first predetermined range of included angle.

Optionally, two rectilinear candidate lane line regions which meet a second predetermined condition are in the same group, where the second predetermined condition includes: fitting line segments of the two rectilinear candidate lane line regions do not overlap each other in a vertical direction, a distance between center points, which are closest to each other in the vertical direction, of the two rectilinear candidate lane line regions is within a second predetermined range of distance, and a directional deviation between the fitting line segments of the two rectilinear candidate lane line regions is within a predetermined range of deviation, where the fitting line segments of the rectilinear candidate lane line regions are obtained by performing rectilinear fitting on center points of the rectilinear candidate lane line regions.

Optionally, the apparatus further includes:

a second recognition unit, configured to, after extracting the center points for each of the candidate lane line regions, recognize the number of effective pixels in the center points as an effective pixel number, for each of the candidate lane line regions; and a filtering unit, configured to filter out ones of the candidate lane line regions, which have effective pixel numbers smaller than a predetermined number threshold, and for the remaining ones of the candidate lane line regions, perform the action of curve fitting on the center points of each of the candidate lane line regions.

Optionally, the first fitting unit 1073 includes:

a first selecting unit, configured to select multiple control points from the center points of each of the candidate lane line regions, where the control points include center points at two ends of each of the candidate lane line regions;

a second fitting unit, configured to obtain curve equations of pairs of adjacent control points in each of the candidate lane line regions by perform fitting on the control points of each of the candidate lane line regions; and a forming unit, configured to form the fitting curve of each of the candidate lane line regions with the curve equations of the pairs of adjacent control points of each of the candidate lane line regions.

Optionally, the first selecting unit includes:

a determining unit, configured to determine whether there is an inflection point in the center points of each of the candidate lane line regions, where the inflection point is a peak point or a valley point;

a second selecting unit, configured to, in response to no inflection point being in the center points of one of the candidate lane line regions, select first target points from the candidate lane line region as the control points, where distances between the pairs of adjacent first target points in the candidate lane line region are equal to each other and the first target points of the candidate lane line region include center points at two ends of the candidate lane line region; and a third selecting unit, configured to, in response to an inflection point being in the center points of the candidate lane line region, select second target points from the candidate lane line region as the control points, where the second target points as the control points of the candidate lane line region include the center points at two ends of the candidate lane line region and the inflection point, distances between any adjacent two second target points located between a center point at a first end of the candidate lane line region and the inflection point are equal to each other and distances between any adjacent two second target points located between a center point at a second end of the candidate lane line region and the inflection point are equal to each other.

Optionally, the apparatus further includes:

a first calculating unit, configured to calculate a real length of each of the candidate lane line regions and determining whether there is an inflection point in the center points of each of the candidate lane line regions, where the inflection point is a peak point or a valley point; and a third recognition unit, configured to recognize ones of the candidate lane line regions, real lengths of which are within a predetermined range of length and the center points of which do not include an inflection point, as rectilinear candidate lane line regions, and, for the rest of the candidate lane line regions, perform the step of classifying the candidate lane line regions as rectilinear candidate lane line regions and curvilinear candidate lane line regions according to the slope angle of the fitting curve of each of the candidate lane line regions.

Optionally, the classifying unit 1704 includes:

a fourth selecting unit, configured to select a first sampling point, a second sampling point and a third sampling point from the center points of each of the candidate lane line regions, where a distance between the first sampling point and the second sampling point is equal to a distance between the second sampling point and the third sampling point;

a second calculating unit, configured to calculate slope angles of the fitting curve at the first sampling point, the second sampling point and the third sampling point as a first slope angle, a second slope angle and a third slope angle, for each of the candidate lane line regions; and a fourth recognition unit, configured to recognize, based on the first slope angle, the second slope angle and the third slope angle of each of the candidate lane line regions, ones of the candidate lane line regions which meet a third predetermined condition or a fourth predetermined condition, as curvilinear candidate lane line regions and other ones of the candidate lane line regions which meet neither the third predetermined condition nor the fourth predetermined condition, as rectilinear candidate lane line regions, where the third predetermined condition is as follows: both a difference between the first slope angle and the second slope angle of the corresponding candidate lane line region and a difference between the second slope angle and the third slope angle of the corresponding candidate lane line region are greater that a first slope angle threshold, and where the fourth predetermined condition is as follows: a difference between the first slope angle and the second slope angle of the corresponding candidate lane line region is smaller than the first slope angle threshold and a difference between the second slope angle and the third slope angle of the corresponding candidate lane line regions is greater than a second slope angle threshold.

Optionally, the fourth selecting unit includes:

a determining unit, configured to determine whether there is an inflection point in the center points of each of the candidate lane line regions, where the inflection point is a peak point or a valley point;

a fifth selecting unit, configured to, in response to no inflection point being in the center points of one of the candidate lane line regions, select any three evenly spaced center points from the candidate lane line region as the first sampling point, the second sampling point and the third sampling point of the candidate lane line region; and a sixth selecting unit, configured to, in response to an inflection point being in the center points of the candidate lane line region, determine the inflection point in the candidate lane line region as the second sampling point of the candidate lane line region and select two center points at two sides of the second sampling point in the candidate lane line region as the first sampling point and the third sampling point of the candidate lane line region, where the distance from the center point selected as the first sampling point to the second sampling point is equal to the distance from the center point selected as the third sampling point to the second sampling point.

Optionally, the determining unit includes:

a searching unit, configured to search for a third target point with a maximum horizontal coordinate and a fourth target point with a minimum horizontal coordinate in the center points of each of the candidate lane line regions;

a first determining unit, configured to determine that there is an inflection point in the center points of the corresponding candidate lane line region in response to the third target point and the fourth target point meeting a fifth predetermined condition or a sixth predetermined condition; and a second determining unit, configured to determine that there is no inflection point in the center points of the corresponding candidate lane line region in response to the third target point and the fourth target point meeting neither the fifth predetermined condition nor the sixth predetermined condition, where the fifth predetermined condition is as follows: the third target point is in the middle of the corresponding candidate lane line region and the fourth target point is in either one of two ends of the corresponding candidate lane line region, and where the sixth predetermined condition is as follows: the fourth target point is in the middle of the corresponding candidate lane line region and the third target point is in either one of the two ends of the corresponding candidate lane line region.

Optionally, in a case that the two rectilinear candidate lane line regions which meet the second predetermined condition are in the same group, the directional deviation between the fitting line segments of the two rectilinear candidate lane line regions being within the predetermined range of deviation includes at least one of the following: an included angle of the fitting line segments of the two rectilinear candidate lane line regions is within a second predetermined range of included angle, an estimated real included angle of the two rectilinear candidate lane line regions is within a third predetermined range of included angle and a deviation distance between the fitting line segments of the two rectilinear candidate lane line regions is within a third predetermined range of distance, where the deviation distance is a distance between a first intersection point and a second intersection point, the first intersection point and the second intersection point are intersection points of extension lines of the fitting line segments of the two rectilinear candidate lane line regions and a horizontal midline, respectively, and distances between closest center points of the two rectilinear candidate lane line regions in the vertical direction and the horizontal midline are equal to each other.

Optionally, in a case that the two rectilinear candidate lane line regions which meet the second predetermined condition are in the same group, the second predetermined condition further includes: in a case that the included angle of the fitting line segments of the two rectilinear candidate lane line regions is within a fourth predetermined range of included angle, the deviation distance between the fitting line segments of the two rectilinear candidate lane line regions is within a fourth predetermined range of distance, where the second predetermined range of included angle is wider than the fourth predetermined range of included angle, and the third predetermined range of distance is wider that the fourth predetermined range of distance.

Optionally, the apparatus further includes:

a third fitting unit, configured to performing fitting on the lane line regions in the target groups after the candidate lane line regions in the target groups are recognized as the lane line regions, to obtain lane lines in the lane image, where the lane line regions in each of the target groups are fitted into a lane line.

With the apparatus according to the embodiment, after the candidate lane line regions are obtained by filtering the lane image, noise regions which do not correspond to real lane lines can be removed from the candidate lane line regions by grouping and matching of the candidate lane line regions, so that regions in the candidate lane line regions, which correspond to real lane lines, can be recognized as lane line regions, which makes detection of lane line regions more accurate and thus makes detection of lane information more accurate, thereby enabling a vehicle departure warning system to give a warning prompt accurately.

Figure 18:
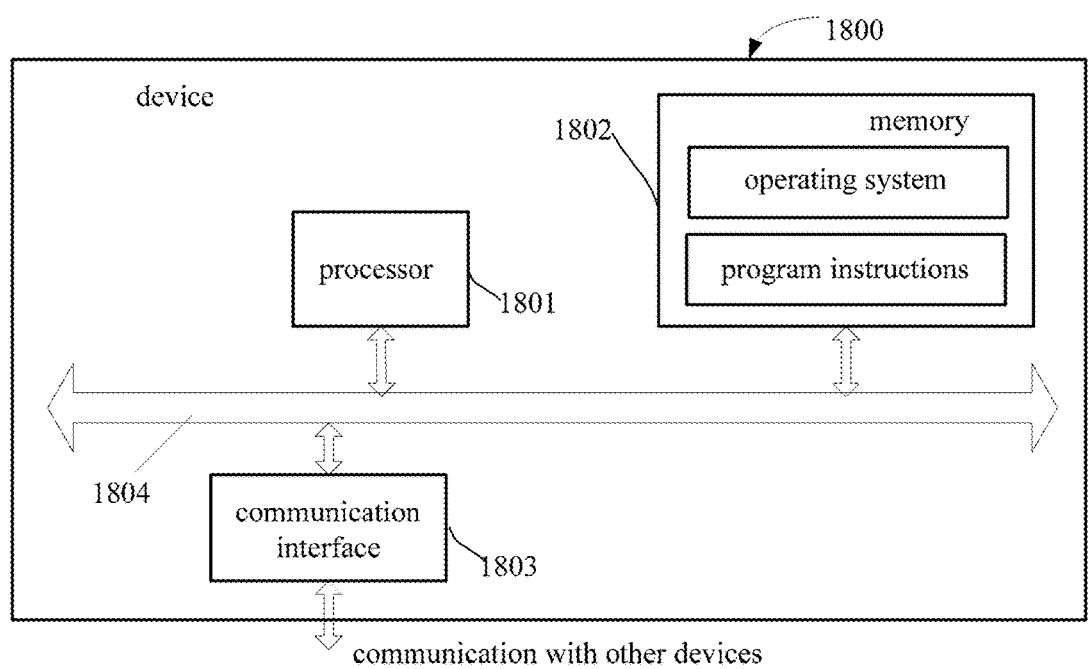
FIG. 18 is a schematic structural diagram of a device for detecting a lane line according to an embodiment of the invention.

Reference is made to FIG. 18, which shows a schematic structural diagram of a device for detecting a lane line according to an embodiment of the invention. In the embodiment, the device 1800 may, for example, include a processor 1801, a memory 1802, a communication interface 1803 and a bus system 1804.

The bus system 1804 is configured to couple hardware of the device together.

The communication interface 1803 is configured to implement communication connection between the device and at least one other device.

The memory 1802 is configured to store program instructions and data.

The processor 1801 is configured to read the instructions and the data stored in the memory and perform the following operations:

determining candidate lane line regions in a lane image by filtering the lane image;

extracting center points for each of the candidate lane line regions, where the center points include a midpoint between two endpoints of each row in each of the candidate lane line regions;

obtaining a fitting curve of each of the candidate lane line regions by performing curve fitting on the center points of each of the candidate lane line regions;

classifying the candidate lane line regions as rectilinear candidate lane line regions and curvilinear candidate lane line regions according to a slope angle of the fitting curve of each of the candidate lane line regions;

dividing the candidate lane line regions into groups based on the classifying result, where each curvilinear candidate lane line region alone forms a group, one or more rectilinear candidate lane line regions form a group and candidate lane line regions in the same group correspond to the same lane line; and determining two of the groups which meet a first predetermined condition, as target groups, and recognizing candidate lane line regions in the target groups as lane line regions, where the first predetermined condition includes at least one of the following: a distance between lane lines corresponding to the two groups is within a first predetermined range of distance, and an included angle of the lane lines corresponding to the two groups is within a first predetermined range of included angle.

Optionally, two rectilinear candidate lane line regions which meet a second predetermined condition are in the same group, where the second predetermined condition includes: fitting line segments of the two rectilinear candidate lane line regions do not overlap each other in a vertical direction, a distance between center points of the two rectilinear candidate lane line regions, which are closest to each other in the vertical direction, is within a second predetermined range of distance, and a directional deviation between the fitting line segments of the two rectilinear candidate lane line regions is within a predetermined range of deviation, where the fitting line segments of the rectilinear candidate lane line regions are obtained by performing rectilinear fitting on center points of the rectilinear candidate lane line regions.

Optionally, after extracting the center points for each of the candidate lane line regions, the processor 1801 may further perform the following operations:

recognizing the number of effective pixels in the center points as an effective pixel number, for each of the candidate lane line regions; and filtering out ones of the candidate lane line regions, which have effective pixel numbers smaller than a predetermined number threshold, and for the remaining ones of the candidate lane line regions, performing the action of curve fitting on the center points of each of the candidate lane line regions.

Optionally, the processor 1801 may obtain the fitting curve of each of the candidate lane line regions by performing the curve fitting on the center points of each of the candidate lane line regions by performing the following operations:

selecting multiple control points from the center points of each of the candidate lane line regions, where the control points include center points at two ends of each of the candidate lane line regions;

obtaining curve equations of pairs of adjacent control points in each of the candidate lane line regions by perform fitting on the control points of each of the candidate lane line regions; and forming the fitting curve of each of the candidate lane line regions with the curve equations of the pairs of adjacent control points of each of the candidate lane line regions.

Optionally, the processor 1801 may select the multiple control points from the center points of each of the candidate lane line regions by performing the following operations:

determining whether there is an inflection point in the center points of each of the candidate lane line regions, where the inflection point is a peak point or a valley point;

in response to no inflection point being in the center points of one of the candidate lane line regions, selecting first target points from the candidate lane line region as the control points, where distances between the pairs of adjacent first target points in the candidate lane line region are equal to each other and the first target points of the candidate lane line region include center points at two ends of the candidate lane line region; and in response to an inflection point being in the center points of the candidate lane line region, selecting second target points from the candidate lane line region as the control points, where the second target points as the control points of the candidate lane line region include center points at two ends of the candidate lane line region and the inflection point, distances between any adjacent two second target points located between a center point at a first end of the candidate lane line region and the inflection point are equal to each other, and distances between any adjacent two second target points located between a center point at a second end of the candidate lane line region and the inflection point are equal to each other.

Optionally, the processor 1801 may further perform the following operations:

calculating a real length of each of the candidate lane line regions and determining whether there is an inflection point in the center points of each of the candidate lane line regions, where the inflection point is a peak point or a valley point; and recognizing ones of the candidate lane line regions, real lengths of which are within a predetermined range of length and the center points of which do not include an inflection point, as rectilinear candidate lane line regions, and, for the rest of the candidate lane line regions, performing the step of classifying the candidate lane line regions as rectilinear candidate lane line regions and curvilinear candidate lane line regions according to the slope angle of the fitting curve of each of the candidate lane line regions.

Optionally, the processor may classify the candidate lane line regions as rectilinear candidate lane line regions and curvilinear candidate lane line regions according to the slope angle of the fitting curve of each of the candidate lane line regions by performing the following operations:

selecting a first sampling point, a second sampling point and a third sampling point from the center points of each of the candidate lane line regions, where a distance between the first sampling point and the second sampling point is equal to a distance between the second sampling point and the third sampling point;

calculating slope angles of the fitting curve at the first sampling point, the second sampling point and the third sampling point as a first slope angle, a second slope angle and a third slope angle, for each of the candidate lane line regions; and recognizing, based on the first slope angle, the second slope angle and the third slope angle of each of the candidate lane line regions, ones of the candidate lane line regions which meet a third predetermined condition or a fourth predetermined condition, as curvilinear candidate lane line regions and other ones of the candidate lane line regions, which meet neither the third predetermined condition nor the fourth predetermined condition, as rectilinear candidate lane line regions, where the third predetermined condition is as follows: both a difference between the first slope angle and the second slope angle of the corresponding candidate lane line region and a difference between the second slope angle and the third slope angle of the corresponding candidate lane line region are greater that a first slope angle threshold, and where the fourth predetermined condition is as follows: a difference between the first slope angle and the second slope angle of the corresponding candidate lane line region is smaller than the first slope angle threshold and a difference between the second slope angle and the third slope angle of the corresponding candidate lane line region is greater than a second slope angle threshold.

Optionally, the processor 1801 may select the first sampling point, the second sampling point and the third sampling point by performing the following operations:

determining whether there is an inflection point in the center points of each of the candidate lane line regions, where the inflection point is a peak point or a valley point;

in response to no inflection point being in the center points of one of the candidate lane line regions, selecting any three evenly spaced center points from the candidate lane line region as the first sampling point, the second sampling point and the third sampling point of the candidate lane line region; and in response to an inflection point being in the center points of the candidate lane line region, determining the inflection point in the candidate lane line region as the second sampling point of the candidate lane line region and selecting two center points at two sides of the second sampling point in the candidate lane line region as the first sampling point and the third sampling point of the candidate lane line region, where the distance from the center point selected as the first sampling point to the second sampling point is equal to the distance from the center point selected as the third sampling point to the second sampling point.

Optionally, the processor 1801 may determine whether there is the inflection point in the center points of each of the candidate lane line regions by performing the following operations:

searching for a third target point with a maximum horizontal coordinate and a fourth target point with a minimum horizontal coordinate in the center points of each of the candidate lane line regions;

in response to the third target point and the fourth target point meeting a fifth predetermined condition or a sixth predetermined condition, determining that there is an inflection point in the center points of the corresponding candidate lane line region; and in response to the third target point and the fourth target point meeting neither the fifth predetermined condition nor the sixth predetermined condition, determining that there is no inflection point in the center points of the corresponding candidate lane line region, where the fifth predetermined condition is as follows: the third target point is in the middle of the corresponding candidate lane line region and the fourth target point is in either one of two ends of the corresponding candidate lane line region, and where the sixth predetermined condition is as follows: the fourth target point is in the middle of the corresponding candidate lane line region and the third target point is in either one of the two ends of the corresponding candidate lane line region.

Optionally, in a case that the two rectilinear candidate lane line regions which meet the second predetermined condition are in the same group, the directional deviation between the fitting line segments of the two rectilinear candidate lane line regions being within the predetermined range of deviation includes at least of the following: an included angle of the fitting line segments of the two rectilinear candidate lane line regions is within a second predetermined range of included angle, an estimated real included angle of the two rectilinear candidate lane line regions is within a third predetermined range of included angle and a deviation distance between the fitting line segments of the two rectilinear candidate lane line regions is within a third predetermined range of distance, where the deviation distance is a distance between a first intersection point and a second intersection point, the first intersection point and the second intersection point are intersection points of extension lines of the fitting line segments of the two rectilinear candidate lane line regions and a horizontal midline, respectively, and distances between closest center points of the two rectilinear candidate lane line regions in the vertical direction and the horizontal midline are equal to each other.

Optionally, in a case that the two rectilinear candidate lane line regions which meet the second predetermined condition are in the same group, the second predetermined condition may further include: in a case that the included angle of the fitting line segments of the two rectilinear candidate lane line regions is within a fourth predetermined range of included angle, the deviation distance between the fitting line segments of the two rectilinear candidate lane line regions is within a fourth predetermined range of distance, where the second predetermined range of included angle is wider than the fourth predetermined range of included angle, and the third predetermined range of distance is wider that the fourth predetermined range of distance.

Optionally, after recognizing the candidate lane line regions in the target groups as lane line regions, the processor 1801 may further perform the following operation:

performing fitting on the lane line regions in the target groups, to obtain lane lines in the lane image, where the lane line regions in each of the target groups are fitted into a lane line.

With the device according to the embodiment, after the candidate lane line regions are obtained by filtering the lane image, noise regions which do not correspond to real lane lines can be removed from the candidate lane line regions by grouping and matching of the candidate lane line regions, so that regions in the candidate lane line regions, which correspond to real lane lines, can be recognized as lane line regions, which makes detection of lane line regions more accurate and thus makes detection of lane information more accurate, thereby enabling a vehicle departure warning system to give a warning prompt accurately.

"First" in "first predetermined condition", "first target point" and "first predetermined range of distance" referred to in the embodiments according to the present disclosure is only used as a name identifier rather than represents the first in order. The rule also applies to "second" and "third".

According to the foregoing descriptions of the embodiments, those skilled in the art can clearly understand that all or some of the steps of the method according to the embodiments above can be implemented through software plus a hardware platform. Based on such understanding, the technical solutions according to the present disclosure can be embodied in the form of a software product, and the computer software product may be stored in a storage medium, such as a read-only memory (ROM), a RAM, a disk or a compact disc, which includes a number of instructions for a computer device (which may be a personal computer, a server, or a network communication device like a router) to implement the methods according to the embodiments or some parts of the embodiments.

The embodiments according to the present disclosure are described in a progressive manner, reference can be made to each other for same or similar parts, and each embodiment emphasizes differences from the others. Especially, being basically similar to the system embodiments, the method embodiments and the device embodiments are thus described briefly and reference can be made to the descriptions of the system embodiments for related parts. The foregoing device and system embodiments are illustrative only, modules described as separate components may be physically separate or not, and components displayed as modules may be physical modules or not, that is, they may be arranged at one position or distributed to multiple network units, where some or all of the modules may be used as practically needed to achieve the object of the technical solutions according to the embodiments. Those skilled in the art can understand and implement the above without any creative efforts.

The foregoing embodiments are only some preferred embodiments of the invention and are not intended to limit the scope of the present disclosure. It should be pointed out that improvements and embellishments may be made by those skilled in the art without deviating from the invention and that these improvements and embellishments shall fall within the scope of the present disclosure.

The invention claimed is:

1. A method for detecting a lane line, comprising:
   determining candidate lane line regions in a lane image by filtering the lane image;
   extracting center points for each of the candidate lane line regions, wherein the center points comprise a midpoint between two endpoints of each row in each of the candidate lane line regions;
   obtaining a fitting curve of each of the candidate lane line regions by performing curve fitting on the center points of each of the candidate lane line regions;
   classifying the candidate lane line regions as rectilinear candidate lane line regions and curvilinear candidate lane line regions according to a slope angle of the fitting curve of each of the candidate lane line regions;
   dividing the candidate lane line regions into groups based on the classifying result, wherein each curvilinear candidate lane line region alone forms a group, one or more rectilinear candidate lane line regions form a group and candidate lane line regions in a same group correspond to a same lane line; and
   determining two of the groups, which meet a first predetermined condition, as target groups, and recognizing candidate lane line regions in the target groups as lane line regions,
   wherein the first predetermined condition comprises at least one of: a distance between lane lines corresponding to the two groups is within a first predetermined range of distance, and an included angle of the lane lines corresponding to the two groups is within a first predetermined range of included angle.

2. The method according to claim 1, wherein two rectilinear candidate lane line regions which meet a second predetermined condition are in a same group,
   wherein the second predetermined condition comprises:
   fitting line segments of the two rectilinear candidate lane line regions do not overlap each other in a vertical direction, a distance between center points, which are closest to each other in the vertical direction, of the two rectilinear candidate lane line regions is within a second predetermined range of distance, and a directional deviation between the fitting line segments of the two rectilinear candidate lane line regions is within a predetermined range of deviation, and
   wherein the fitting line segments of the rectilinear candidate lane line regions are obtained by performing rectilinear fitting on center points of the rectilinear candidate lane line regions.

3. The method according to claim 1, wherein after extracting center points for each of the candidate lane line regions, the method further comprises:
   recognizing the number of effective pixels in the center points as an effective pixel number, for each of the candidate lane line regions; and
   filtering out ones of the candidate lane line regions, which have effective pixel numbers smaller than a predetermined number threshold, and for the remaining ones of the candidate lane line regions, performing the action of curve fitting on the center points of each of the candidate lane line regions.

4. The method according to claim 1, wherein obtaining the fitting curve of each of the candidate lane line regions by performing curve fitting on the center points of each of the candidate lane line regions comprises:
   selecting a plurality of control points from the center points of each of the candidate lane line regions, wherein the control points comprise center points at two ends of each of the candidate lane line regions;
   obtaining curve equations of pairs of adjacent control points in each of the candidate lane line regions by performing fitting on the control points of each of the candidate lane line regions; and
   forming the fitting curve of each of the candidate lane line regions with the curve equations of the pairs of adjacent control points of each of the candidate lane line regions.

5. The method according to claim 4, wherein selecting the plurality of control points from the center points of each of the candidate lane line regions comprises:
   determining whether there is an inflection point in the center points of each of the candidate lane line regions, wherein the inflection point is a peak point or a valley point;
   in response to no inflection point being in the center points of one of the candidate lane line regions, selecting first target points from the candidate lane line region as the control points, wherein distances between the pairs of adjacent first target points in the candidate lane line region are equal to each other and the first target points of the candidate lane line region comprise center points at two ends of the candidate lane line region; and
   in response to an inflection point being in the center points of the candidate lane line region, selecting second target points from the candidate lane line region as the control points, wherein the second target points as the control points of the candidate lane line region comprise the center points at two ends of the candidate lane line region and the inflection point, distances between adjacent two second target points located between a center point at a first end of the candidate lane line region and the inflection point are equal to each other, and distances between adjacent two second target points located between a center point at a second end of the candidate lane line region and the inflection point are equal to each other.

6. The method according to claim 1, further comprising:
calculating a real length of each of the candidate lane line regions and determining whether there is an inflection point in the center points of each of the candidate lane line regions, wherein the inflection point is a peak point or a valley point; and
recognizing ones of the candidate lane line regions, real lengths of which are within a predetermined range of length and the center points of which do not include an inflection point, as rectilinear candidate lane line regions, and, for the rest of the candidate lane line regions, performing the step of classifying the candidate lane line regions as rectilinear candidate lane line regions and curvilinear candidate lane line regions according to the slope angle of the fitting curve of each of the candidate lane line regions.

7. The method according to claim 1, wherein classifying the candidate lane line regions as rectilinear candidate lane line regions and curvilinear candidate lane line regions according to the slope angle of the fitting curve of each of the candidate lane line regions comprises:
selecting a first sampling point, a second sampling point and a third sampling point from the center points of each of the candidate lane line regions;
calculating slope angles of the fitting curve at the first sampling point, the second sampling point and the third sampling point as a first slope angle, a second slope angle and a third slope angle, for each of the candidate lane line regions; and
recognizing, based on the first slope angle, the second slope angle and the third slope angle of each of the candidate lane line regions, ones of the candidate lane line regions, which meet a third predetermined condition or a fourth predetermined condition, as curvilinear candidate lane line regions and other ones of the candidate lane line regions, which meet neither the third predetermined condition nor the fourth predetermined condition, as rectilinear candidate lane line regions,
wherein the third predetermined condition is that both a difference between the first slope angle and the second slope angle of the corresponding candidate lane line region and a difference between the second slope angle and the third slope angle of the corresponding candidate lane line region are greater that a first slope angle threshold, and
wherein the fourth predetermined condition is that a difference between the first slope angle and the second slope angle of the corresponding candidate lane line region is smaller than the first slope angle threshold and a difference between the second slope angle and the third slope angle of the corresponding candidate lane line region is greater than a second slope angle threshold.

8. The method according to claim 7, wherein selecting the first sampling point, the second sampling point and the third sampling point from the center points of each of the candidate lane line regions comprises:

determining whether there is an inflection point in the center points of each of the candidate lane line regions, wherein the inflection point is a peak point or a valley point;
in response to no inflection point being in the center points of one of the candidate lane line regions, selecting any three center points from the candidate lane line region as the first sampling point, the second sampling point and the third sampling point of the candidate lane line region; and
in response to an inflection point being in the center points of the candidate lane line region, determining the inflection point in the candidate lane line region as the second sampling point of the candidate lane line region and selecting two center points at two sides of the second sampling point in the candidate lane line region as the first sampling point and the third sampling point of the candidate lane line region.

9. The method according to claim 5, wherein determining whether there is the inflection point in the center points of each of the candidate lane line regions comprises:
searching for a third target point with a maximum horizontal coordinate and a fourth target point with a minimum horizontal coordinate in the center points of each of the candidate lane line regions;
in response to the third target point and the fourth target point meeting a fifth predetermined condition or a sixth predetermined condition, determining that there is an inflection point in the center points of the corresponding candidate lane line region; and
in response to the third target point and the fourth target point meeting neither the fifth predetermined condition nor the sixth predetermined condition, determining that there is no inflection point in the center points of the corresponding candidate lane line region,
wherein the fifth predetermined condition is that, the third target point is in the middle of the corresponding candidate lane line region and the fourth target point is in either one of two ends of the corresponding candidate lane line region, and
wherein the sixth predetermined condition is that, the fourth target point is in the middle of the corresponding candidate lane line region and the third target point is in either one of the two ends of the corresponding candidate lane line region.

10. The method according to claim 6, wherein determining whether there is the inflection point in the center points of each of the candidate lane line regions comprises:
searching for a third target point with a maximum horizontal coordinate and a fourth target point with a minimum horizontal coordinate in the center points of each of the candidate lane line regions;
in response to the third target point and the fourth target point meeting a fifth predetermined condition or a sixth predetermined condition, determining that there is an inflection point in the center points of the corresponding candidate lane line region; and
in response to the third target point and the fourth target point meeting neither the fifth predetermined condition nor the sixth predetermined condition, determining that there is no inflection point in the center points of the corresponding candidate lane line region,
wherein the fifth predetermined condition is that, the third target point is in the middle of the corresponding candidate lane line region and the fourth target point is in either one of two ends of the corresponding candidate lane line region, and wherein the sixth predetermined condition is that, the fourth target point is in the middle of the corresponding candidate lane line region and the third target point is in either one of the two ends of the corresponding candidate lane line region.

11. The method according to claim 8, wherein determining whether there is the inflection point in the center points of each of the candidate lane line regions comprises:
searching for a third target point with a maximum horizontal coordinate and a fourth target point with a minimum horizontal coordinate in the center points of each of the candidate lane line regions;
in response to the third target point and the fourth target point meeting a fifth predetermined condition or a sixth predetermined condition, determining that there is an inflection point in the center points of the corresponding candidate lane line region; and
in response to the third target point and the fourth target point meeting neither the fifth predetermined condition nor the sixth predetermined condition, determining that there is no inflection point in the center points of the corresponding candidate lane line region,
wherein the fifth predetermined condition is that, the third target point is in the middle of the corresponding candidate lane line region and the fourth target point is in either one of two ends of the corresponding candidate lane line region, and
wherein the sixth predetermined condition is that, the fourth target point is in the middle of the corresponding candidate lane line region and the third target point is in either one of the two ends of the corresponding candidate lane line region.

12. The method according to claim 2, wherein the directional deviation between the fitting line segments of the two rectilinear candidate lane line regions being within the predetermined range of deviation comprises at least of: an included angle of the fitting line segments of the two rectilinear candidate lane line regions is within a second predetermined range of included angle, an estimated real included angle of the two rectilinear candidate lane line regions is within a third predetermined range of included angle and a deviation distance between the fitting line segments of the two rectilinear candidate lane line regions is within a third predetermined range of distance,
wherein the deviation distance is a distance between a first intersection point and a second intersection point, the first intersection point and the second intersection point are intersection points of extension lines of the fitting line segments of the two rectilinear candidate lane line regions and a horizontal midline, respectively, and distances between closest center points of the two rectilinear candidate lane line regions in the vertical direction and the horizontal midline are equal to each other.

13. The method according to claim 2, wherein the second predetermined condition further comprises: in a case that the included angle of the fitting line segments of the two rectilinear candidate lane line regions is within a fourth predetermined range of included angle, the deviation distance between the fitting line segments of the two rectilinear candidate lane line regions is within a fourth predetermined range of distance,
wherein the second predetermined range of included angle is wider than the fourth predetermined range of included angle and the third predetermined range of distance is wider that the fourth predetermined range of distance.

14. The method according to claim 1, wherein after recognizing candidate lane line regions in the target groups as lane line regions, the method further comprises:
performing fitting on the lane line regions in the target groups, to obtain lane lines in the lane image,
wherein the lane line regions in each of the target groups are fitted into a lane line.

15. An apparatus for detecting a lane line, comprising:
a filtering unit, configured to determine candidate lane line regions in a lane image by filtering the lane image;
an extracting unit, configured to extract center points for each of the candidate lane line regions, wherein the center points comprise a midpoint between two endpoints of each row in each of the candidate lane line regions;
a first fitting unit, configured to obtain a fitting curve of each of the candidate lane line regions by performing curve fitting on the center points of each of the candidate lane line regions;
a classifying unit, configured to classify the candidate lane line regions as rectilinear candidate lane line regions and curvilinear candidate lane line regions according to a slope angle of the fitting curve of each of the candidate lane line regions;
a grouping unit, configured to divide the candidate lane line regions into groups based on the classifying result, wherein each curvilinear candidate lane line region alone forms a group, one or more rectilinear candidate lane line regions form a group and candidate lane line regions in a same group correspond to a same lane line; and
a first recognition unit, configured to determine two of the groups, which meet a first predetermined condition, as target groups and recognize candidate lane line regions in the target groups as lane line regions,
wherein the first predetermined condition comprises at least one of: a distance between lane lines corresponding to the two groups is within a first predetermined range of distance, and an included angle of the lane lines corresponding to the two groups is within a first predetermined range of included angle.

16. The apparatus according to claim 15, wherein two rectilinear candidate lane line regions which meet a second predetermined condition are in a same group,
wherein the second predetermined condition comprises: fitting line segments of the two rectilinear candidate lane line regions do not overlap each other in a vertical direction, a distance between center points, which are closest to each other in the vertical direction, of the two rectilinear candidate lane line regions is within a second predetermined range of distance, and a directional deviation between the fitting line segments of the two rectilinear candidate lane line regions is within a predetermined range of deviation, and
wherein the fitting line segments of the rectilinear candidate lane line regions are obtained by performing rectilinear fitting on center points of the rectilinear candidate lane line regions.

17. The apparatus according to claim 15, further comprising:
a second recognition unit, configured to, after extracting the center points for each of the candidate lane line regions, recognize the number of effective pixels in the center points as an effective pixel number, for each of the candidate lane line regions; and
a filtering unit, configured to filter out ones of the candidate lane line regions, which have effective pixel numbers smaller than a predetermined number threshold, and for the remaining ones of the candidate lane line regions, perform the action of curve fitting on the center points of each of the candidate lane line regions.

18. The apparatus according to claim 15, wherein the first fitting unit comprises:
   a first selecting unit, configured to select multiple control points from the center points of each of the candidate lane line regions, where the control points include center points at two ends of each of the candidate lane line regions;
   a second fitting unit, configured to obtain curve equations of pairs of adjacent control points in each of the candidate lane line regions by performing fitting on the control points of each of the candidate lane line regions; and
   a forming unit, configured to form the fitting curve of each of the candidate lane line regions with the curve equations of the pairs of adjacent control points of each of the candidate lane line regions.

19. The apparatus according to claim 15, further comprising:
   a first calculating unit, configured to calculate a real length of each of the candidate lane line regions and determining whether there is an inflection point in the center points of each of the candidate lane line regions, where the inflection point is a peak point or a valley point; and
   a third recognition unit, configured to recognize ones of the candidate lane line regions, real lengths of which are within a predetermined range of length and the center points of which do not include an inflection point, as rectilinear candidate lane line regions, and, for the rest of the candidate lane line regions, perform the step of classifying the candidate lane line regions as rectilinear candidate lane line regions and curvilinear candidate lane line regions according to the slope angle of the fitting curve of each of the candidate lane line regions.

20. A device for detecting a lane line, comprising a processor, a memory, a communication interface and a bus system, wherein,
   the bus system is configured to couple hardware of the device together;
   the communication interface is configured to implement communication connection between the device and at least one other device;
   the memory is configured to store program instructions and data; and
   the processor is configured to read the instructions and the data stored in the memory and perform the following operations:
   determining candidate lane line regions in a lane image by filtering the lane image;
   extracting center points for each of the candidate lane line regions, wherein the center points comprise a midpoint between two endpoints of each row in each of the candidate lane line regions;
   obtaining a fitting curve of each of the candidate lane line regions by performing curve fitting on the center points of each of the candidate lane line regions;
   classifying the candidate lane line regions as rectilinear candidate lane line regions and curvilinear candidate lane line regions according to a slope angle of the fitting curve of each of the candidate lane line regions;
   dividing the candidate lane line regions into groups based on the classifying result, wherein each curvilinear candidate lane line region alone forms a group, one or more rectilinear candidate lane line regions form a group and candidate lane line regions in a same group correspond to a same lane line; and
   determining two of the groups, which meet a first predetermined condition, as target groups, and recognizing candidate lane line regions in the target groups as lane line regions,
   wherein the first predetermined condition comprises at least one of: a distance between lane lines corresponding to the two groups is within a first predetermined range of distance, and an included angle of the lane lines corresponding to the two groups is within a first predetermined range of included angle.

* * * * *

UNITED STATES PATENT AND TRADEMARK OFFICE
CERTIFICATE OF CORRECTION

PATENT NO. : 10,140,529 B2  
APPLICATION NO. : 15/361074  
DATED : November 27, 2018  
INVENTOR(S) : Wenjing Bai et al.

Page 1 of 1

It is certified that error appears in the above-identified patent and that said Letters Patent is hereby corrected as shown below:

On the Title Page

The second assignee's name is wrong, so please amend (73) Assignees as follows:  
NEUSOFT CORPORATION, Shenyang (CN); NEUSOFT REACH AUTOMOTIVE TECHNOLOGY (SHANGHAI) CO., LTD., Shanghai (CN)

Signed and Sealed this  
Twenty-sixth Day of February, 2019

Andrei Iancu  
*Director of the United States Patent and Trademark Office*